United States Patent
Moore et al.

(12) 
(10) Patent No.: US 11,878,599 B2
(45) Date of Patent: Jan. 23, 2024

(54) DELIVERY CHARGER FOR ELECTRIC VEHICLE

(71) Applicant: Oshkosh Corporation, Oshkosh, WI (US)

(72) Inventors: Michael Moore, Oshkosh, WI (US); Jon Branson, Oshkosh, WI (US); Greg Steffens, Oshkosh, WI (US); Jeff Verhagen, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 18/171,137

(22) Filed: Feb. 17, 2023

(65) Prior Publication Data

US 2023/0311682 A1  Oct. 5, 2023

Related U.S. Application Data

(60) Provisional application No. 63/325,634, filed on Mar. 31, 2022.

(51) Int. Cl.
| | |
|---|---|
| *B60L 53/00* | (2019.01) |
| *B60L 53/18* | (2019.01) |
| *B60L 53/53* | (2019.01) |
| *B60L 53/54* | (2019.01) |
| *B60L 53/50* | (2019.01) |

(52) U.S. Cl.
CPC ............... *B60L 53/18* (2019.02); *B60L 53/50* (2019.02); *B60L 53/53* (2019.02); *B60L 53/54* (2019.02)

(58) Field of Classification Search
CPC .......... B60L 53/00; B60L 53/53; B60L 53/60; B60L 53/54; B60L 53/18
USPC ...................................................... 180/65.31
See application file for complete search history.

(56) References Cited

U.S. PATENT DOCUMENTS

| | | | | |
|---|---|---|---|---|
| 9,573,452 | B2* | 2/2017 | Agnew | B60K 1/00 |
| 10,766,478 | B2* | 9/2020 | Healy | B60L 50/15 |
| 10,960,773 | B2* | 3/2021 | Healy | B60L 8/003 |
| 11,094,988 | B2* | 8/2021 | Richter | B60W 50/0097 |
| 2005/0253344 | A1 | 11/2005 | Trinkner et al. | |
| 2006/0037760 | A1 | 2/2006 | Froland et al. | |

(Continued)

OTHER PUBLICATIONS https://info.macktrucks.com/refuse-revolution; "Welcome to the refuse revolution. Mack LR Electric." Retrieved on Mar. 21, 2023.

(Continued)

*Primary Examiner* — Hau V Phan
(74) *Attorney, Agent, or Firm* — Foley & Lardner LLP

(57) ABSTRACT

An electric vehicle system includes an electric vehicle and a delivery charger. The electric vehicle includes a chassis, a cab coupled to a front end of the chassis, and a battery supported by the chassis. The delivery charger includes a support, a power generator coupled to the support, a fuel tank coupled to the support and fluidly coupled to the power generator, and a mounting assembly coupled to the support. The power generator is configured to receive a fuel from the fuel tank and generate electricity to charge the battery. The mounting assembly is configured to facilitate releasably mounting the delivery charger at least one of (i) directly to the chassis, (ii) within a body assembly coupled to the chassis, or (iii) to a lift assembly coupled to the body assembly.

19 Claims, 28 Drawing Sheets

(56) References Cited

U.S. PATENT DOCUMENTS

| | | | |
|---|---|---|---|
| 2007/0012496 A1* | 1/2007 | Chene | B60K 1/04 |
| | | | 180/68.5 |
| 2007/0284156 A1 | 12/2007 | Grady et al. | |
| 2007/0286736 A1 | 12/2007 | Grady et al. | |
| 2012/0193109 A1 | 8/2012 | Moore et al. | |
| 2012/0303397 A1* | 11/2012 | Prosser | B60L 53/18 |
| | | | 705/7.12 |
| 2014/0238704 A1 | 8/2014 | Moore et al. | |
| 2016/0144209 A1 | 5/2016 | Moore | |
| 2016/0207418 A1* | 7/2016 | Bergstrom | B60G 3/08 |
| 2017/0056695 A1 | 3/2017 | Moore | |
| 2017/0182340 A1 | 6/2017 | Moore | |
| 2018/0064973 A1 | 3/2018 | Moore | |
| 2019/0001830 A1* | 1/2019 | Cao | G01B 5/25 |
| 2019/0175971 A1 | 6/2019 | Moore et al. | |
| 2019/0224516 A1 | 7/2019 | Moore et al. | |
| 2020/0094690 A1* | 3/2020 | Sondur | B60L 1/003 |
| 2020/0290237 A1 | 9/2020 | Steffens et al. | |
| 2020/0291846 A1 | 9/2020 | Steffens et al. | |
| 2020/0317083 A1* | 10/2020 | Messina | B60P 3/16 |
| 2021/0009006 A1* | 1/2021 | Gaze | B60L 53/62 |
| 2021/0146776 A1* | 5/2021 | Bollinger | H01M 10/425 |
| 2021/0188069 A1* | 6/2021 | Friedman | B62D 27/06 |
| 2021/0229591 A1* | 7/2021 | Dannar | B60K 17/358 |
| 2021/0339648 A1* | 11/2021 | Koga | B60K 1/04 |
| 2021/0402235 A1 | 12/2021 | Moore | |
| 2022/0009761 A1 | 1/2022 | Archer et al. | |
| 2022/0072736 A1 | 3/2022 | Steffens et al. | |
| 2022/0118854 A1 | 4/2022 | Davis et al. | |

OTHER PUBLICATIONS https://www.youtube.com/watch?v=NQFtAnm7D-c; "All-New Mack LR Electric Garbage Truck." Retrieved on Mar. 21, 2023.

* cited by examiner

DELIVERY CHARGER FOR ELECTRIC VEHICLE

CROSS-REFERENCE TO RELATED PATENT APPLICATION

This application claims the benefit of and priority to U.S. patent application No. 63/325,634, filed Mar. 31, 2022, which is incorporated herein by reference in its entirety.

BACKGROUND

The present disclosure relates generally to vehicles. More specifically, the present disclosure relates to electric vehicles and the transportation or delivery thereof over distances greater than the range capability of the electric vehicle on a single charge.

SUMMARY

One embodiment relates to an electric vehicle system. The electric vehicle system includes an electric vehicle and a delivery charger. The electric vehicle includes a chassis, a cab coupled to a front end of the chassis, and a battery supported by the chassis. The delivery charger includes a support, a mounting assembly coupled to the support, and an electrical energy source coupled to the support. The electrical energy source is configured to provide electricity to charge the battery. The mounting assembly is configured to facilitate releasably mounting the delivery charger at least one of (i) directly to the chassis, (ii) within a body assembly coupled to the chassis, or (iii) to a lift assembly coupled to the body assembly.

Another embodiment relates to an electric vehicle system. The electric vehicle system includes an electric vehicle and a delivery charger. The electric vehicle includes a chassis, a cab coupled to a front end of the chassis, and a battery supported by the chassis. The delivery charger includes a support, an electrical energy source coupled to the support, and a mounting assembly coupled to the support. The electrical energy source is configured to provide electricity to charge the battery. The mounting assembly is configured to facilitate releasably mounting the delivery charger to the electric vehicle.

Still another embodiment relates to an electric vehicle system. The electric vehicle system includes an electric refuse vehicle and a delivery charger. The electric refuse vehicle includes a chassis, a cab coupled to a front end of the chassis, a body assembly coupled to the chassis behind the cab, a lift assembly coupled to the body assembly, and a battery supported by the chassis. The cab includes a charging port positioned at or proximate a front thereof. The delivery charger includes a support, an electrical energy source coupled to the support, and a mounting assembly coupled to the support. The mounting assembly is configured to facilitate releasably mounting the delivery charger to the lift assembly. With the lift assembly in a first position, the delivery charger is electrically connectable to the charging port. With the lift assembly in a second position, the delivery charger is positioned at least partially within the body assembly.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an electric vehicle includes on-board electrical energy storage that powers one or more tractive motors to drive the electric vehicle. The electric energy storage is configured (e.g., sized, designed, etc.) to provide sufficient charge and range to facilitate completion of the daily tasks for which the electric vehicle is designed to perform (e.g., complete a daily refuse collection route, fire response, concrete delivery, daily commute, etc.) without requiring recharging. However, the electric vehicle may be manufactured in a location remote or distant from the end user or the electric vehicle may be manufactured and/or assembled in multiple locations at significant distances from one another and, therefore, the range provided by the electric energy storage may not be sufficient to drive the vehicle between manufacture/assembly locations or from the manufacture/assembly location to the end user location on a single charge. Typically, smaller electric vehicles would be towed or otherwise shipped across such great distances. But, as electrification extends to larger vehicle types (e.g., refuse vehicles, fire trucks, concrete mixers, semi-tractors, etc.), towing such large electric vehicles can be difficult, labor intensive, expensive, and produce significant amounts of greenhouse gas emissions contributing to climate change. Therefore, today, delivery of such large electric vehicles typically requires significant route planning efforts to make sure that the electric vehicles follow routes where charging stations are strategically located to provide charging when needed, which can significantly increase the distance the electric vehicle is required to drive and/or significantly increase the total time to complete the trip. The electric vehicle of the present disclosure includes an auxiliary power unit ("APU") or delivery charger that facilitates extending the range of the electric vehicle to facilitate driving the electric vehicle over great distances, without needing to follow specific routes for charging purposes, thereby, improving the deliverability of larger electric vehicles. The delivery charger, therefore, facilitates the delivery of zero-emission electric vehicles along routes and to locations that otherwise would not have the requisite charging infrastructure to facilitate such delivery while emitting substantially less greenhouse gas emissions relative to traditional vehicle delivery methods.

Overall Vehicle

Figure 1:
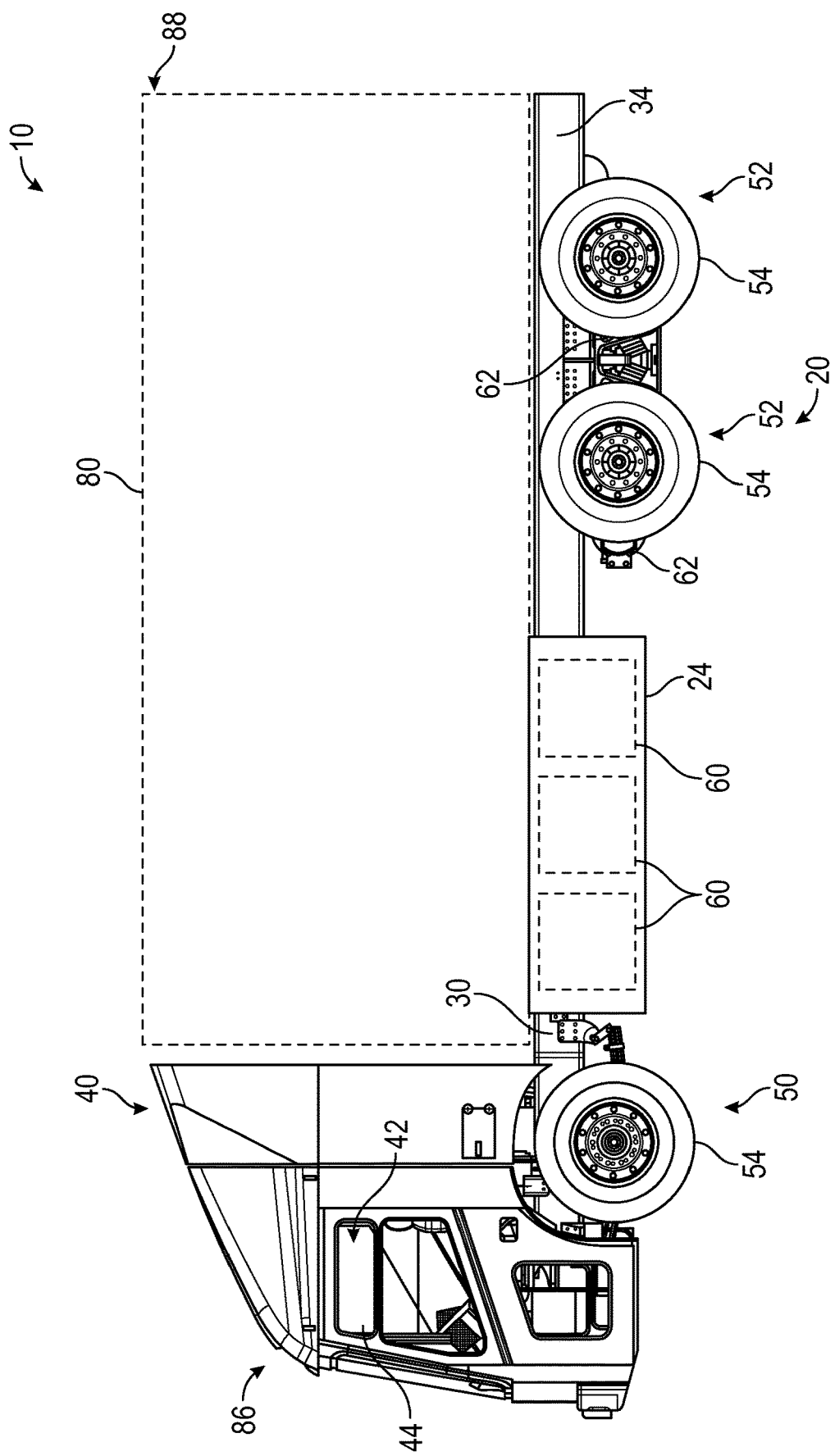
FIG. 1 is a left side view of a vehicle, according to an exemplary embodiment.
Figure 2:
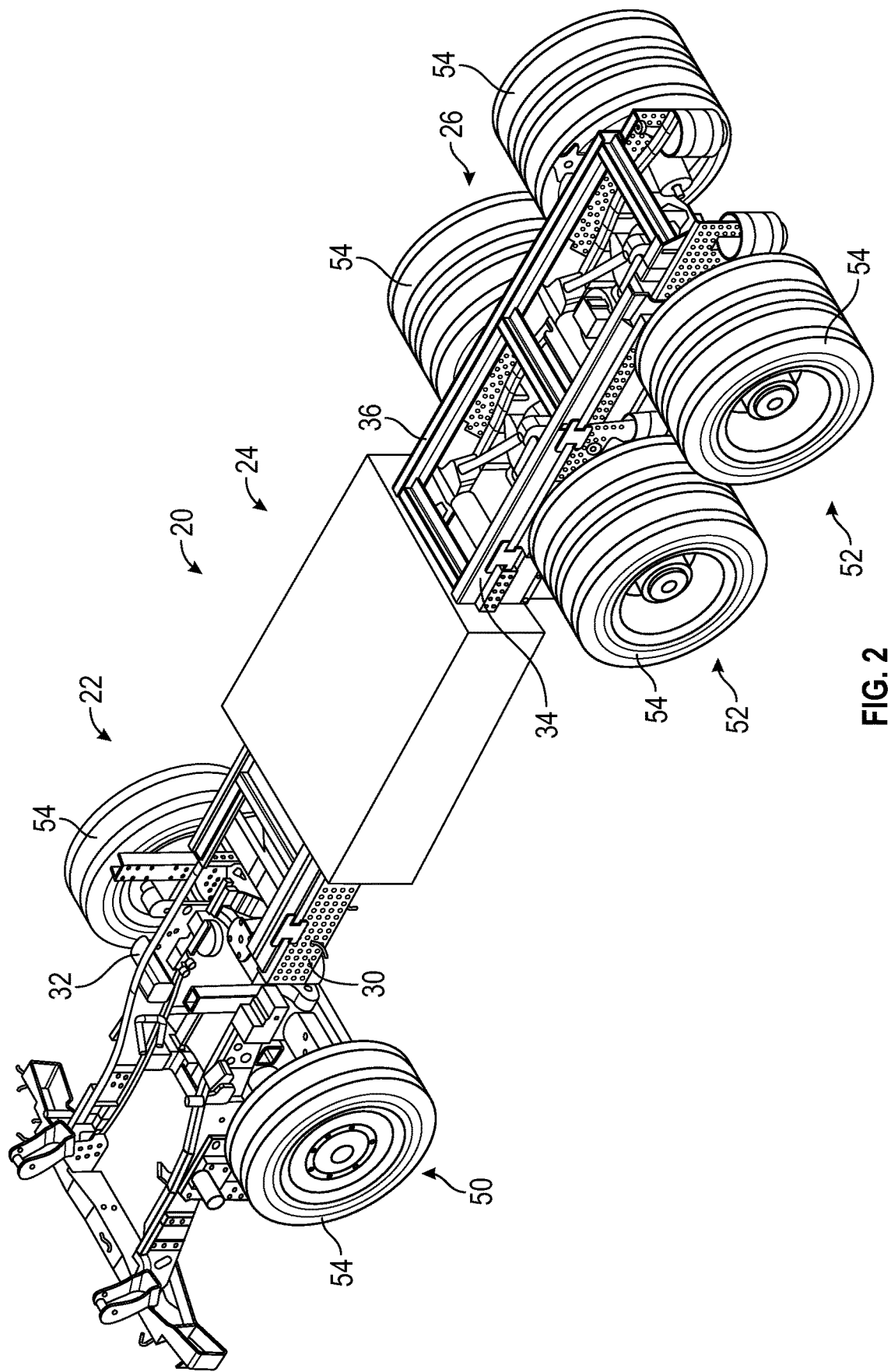
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10 (e.g., on or within the body/application kit 80). The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 54 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis 20. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
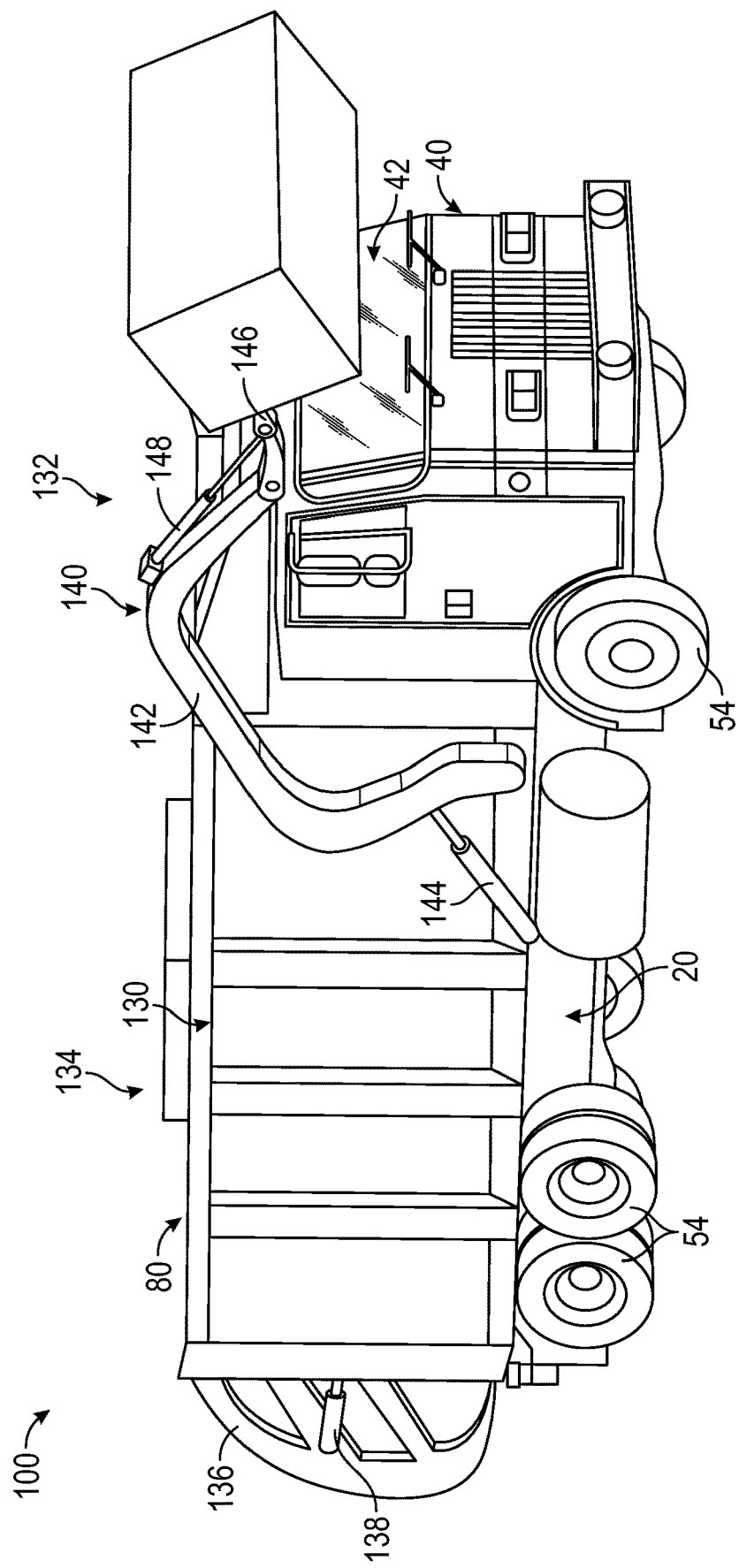
FIG. 3 is a perspective view of the vehicle of FIG. 1 configured as a front-loading refuse vehicle, according to an exemplary embodiment.
Figure 4:
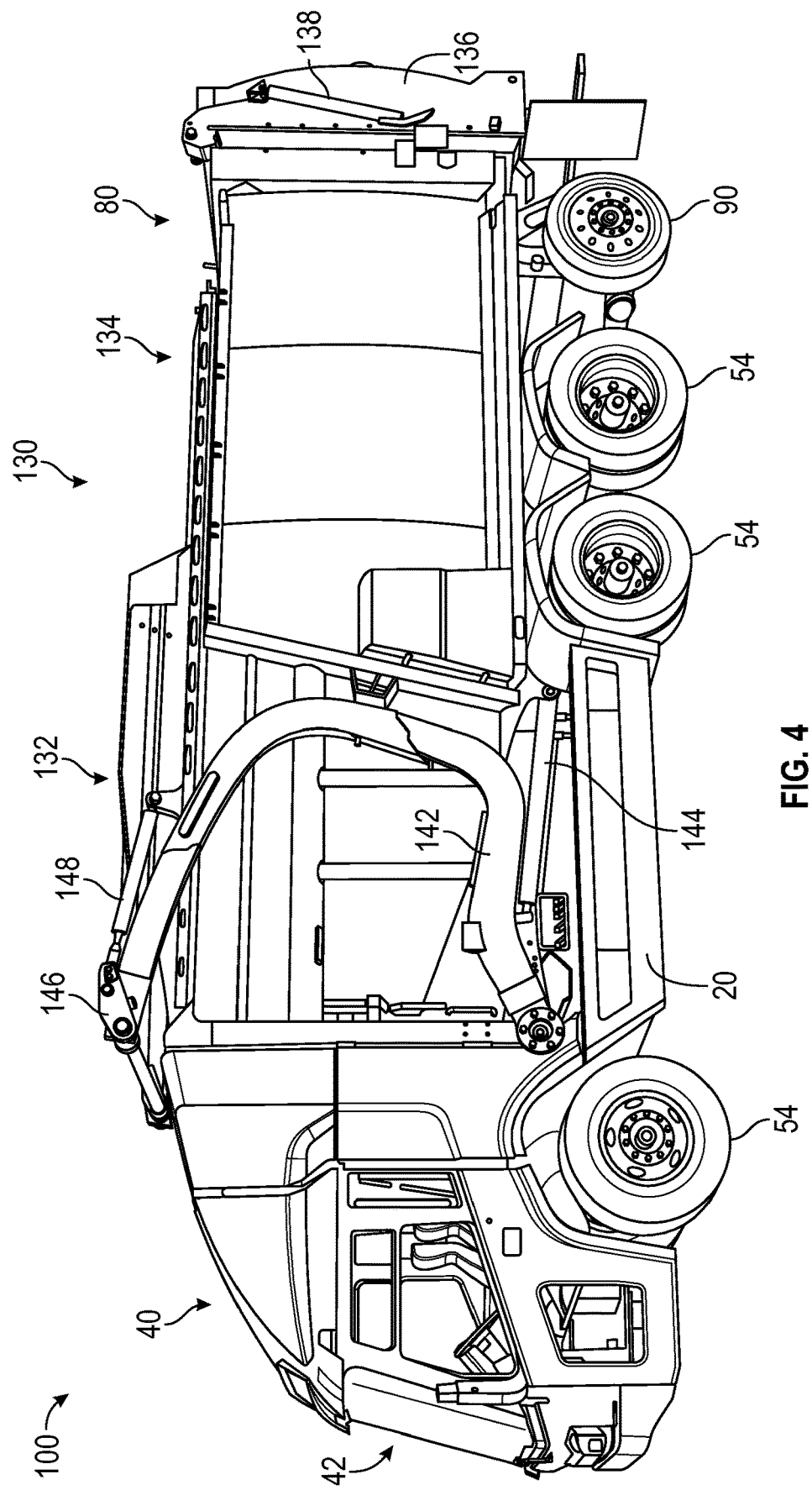
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms, shown as lift arms 142, and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
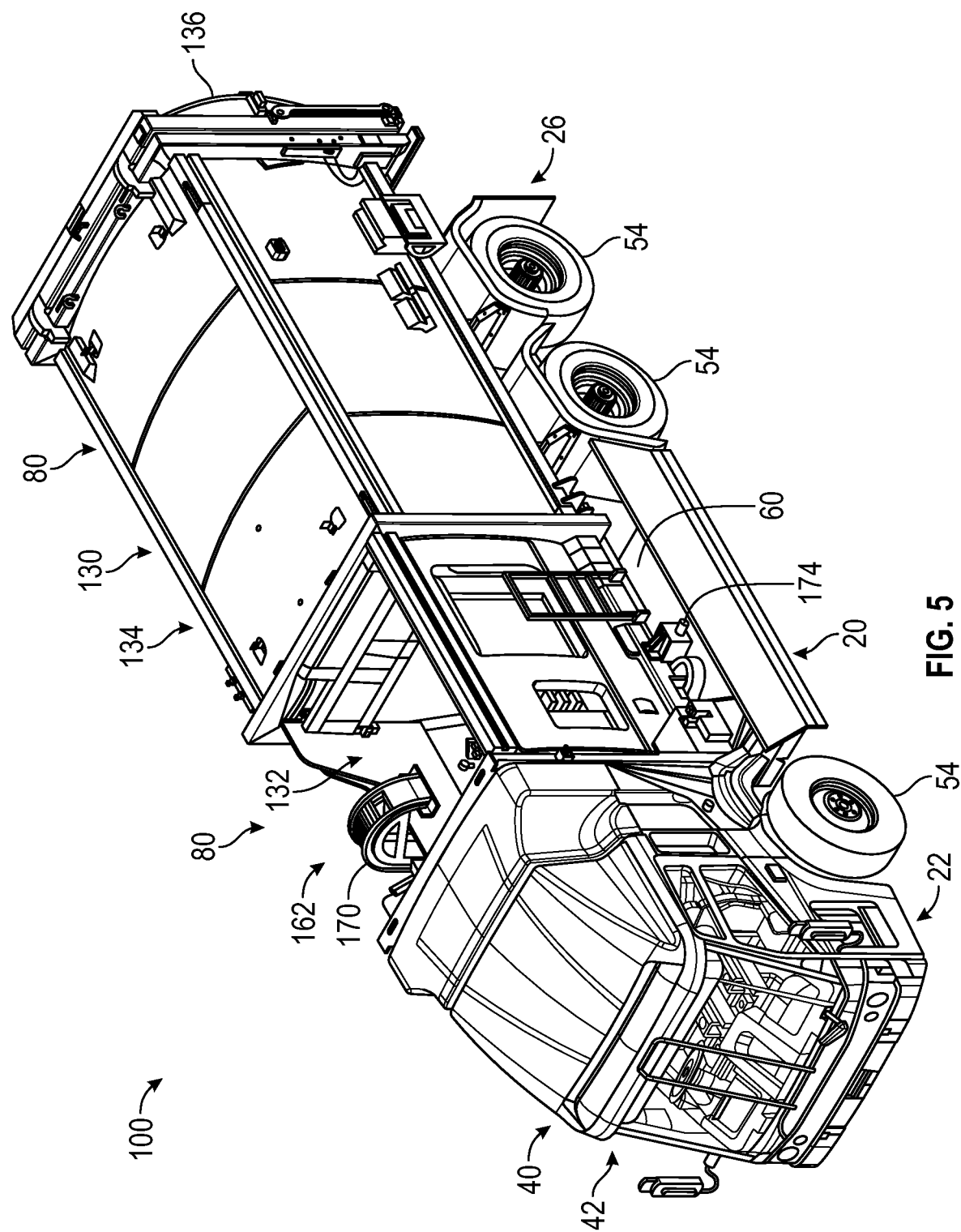
FIG. 5 is a perspective view of the vehicle of FIG. 1 configured as a side-loading refuse vehicle, according to an exemplary embodiment.
Figure 6:
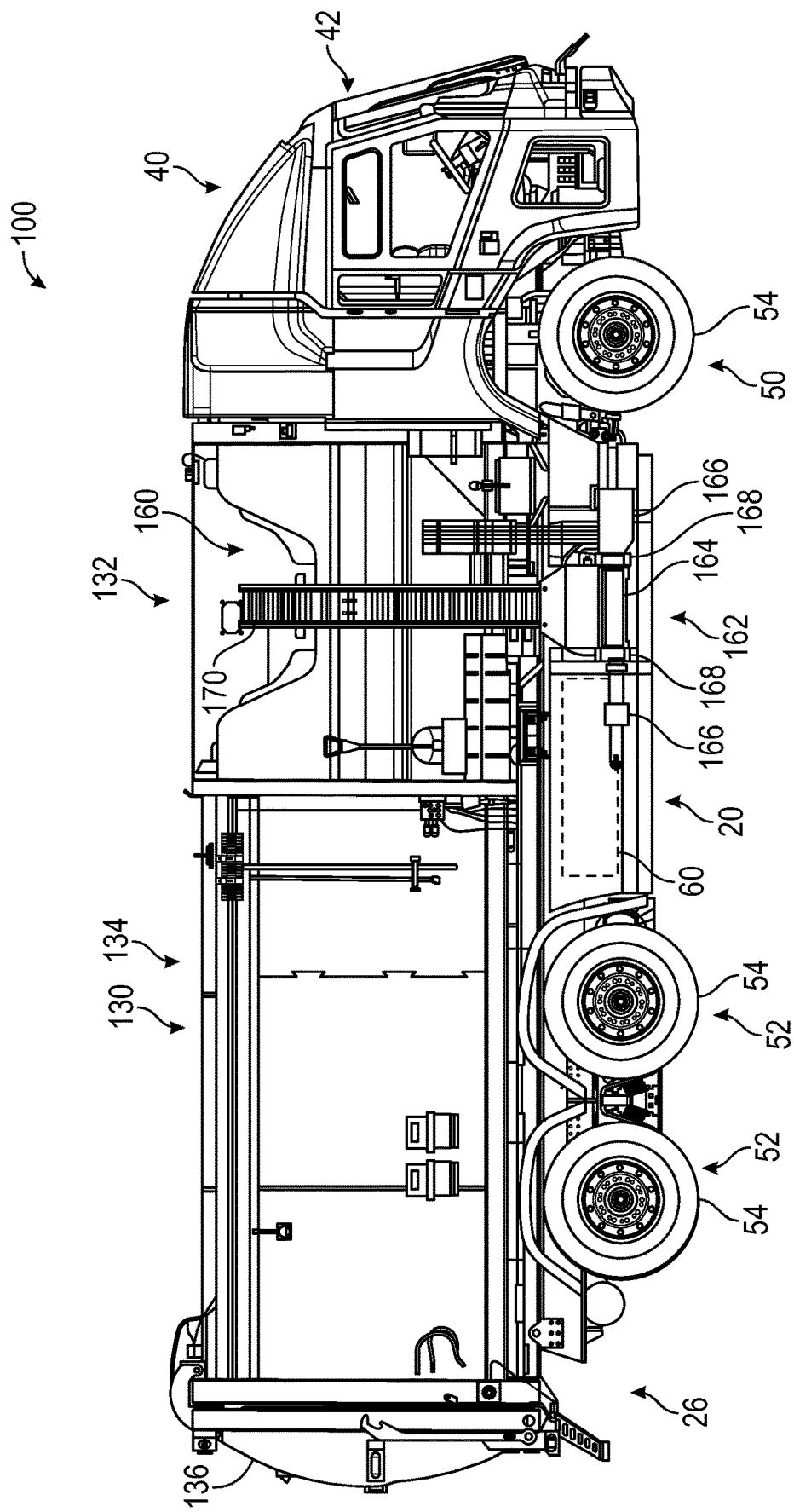
FIG. 6 is a right side view of the side-loading refuse vehicle of FIG. 5.
Figure 7:
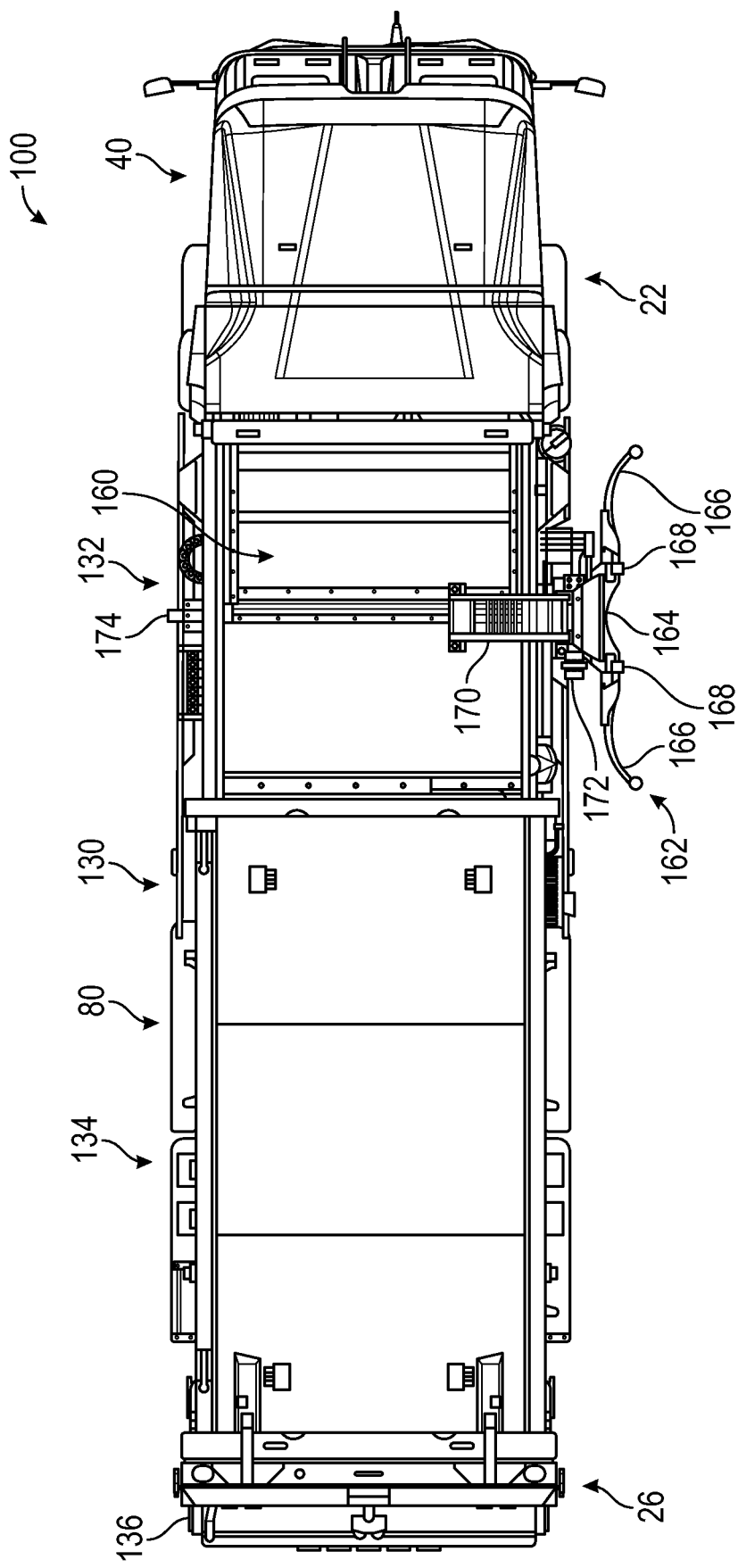
FIG. 7 is a top view of the side-loading refuse vehicle of FIG. 5.
Figure 8:
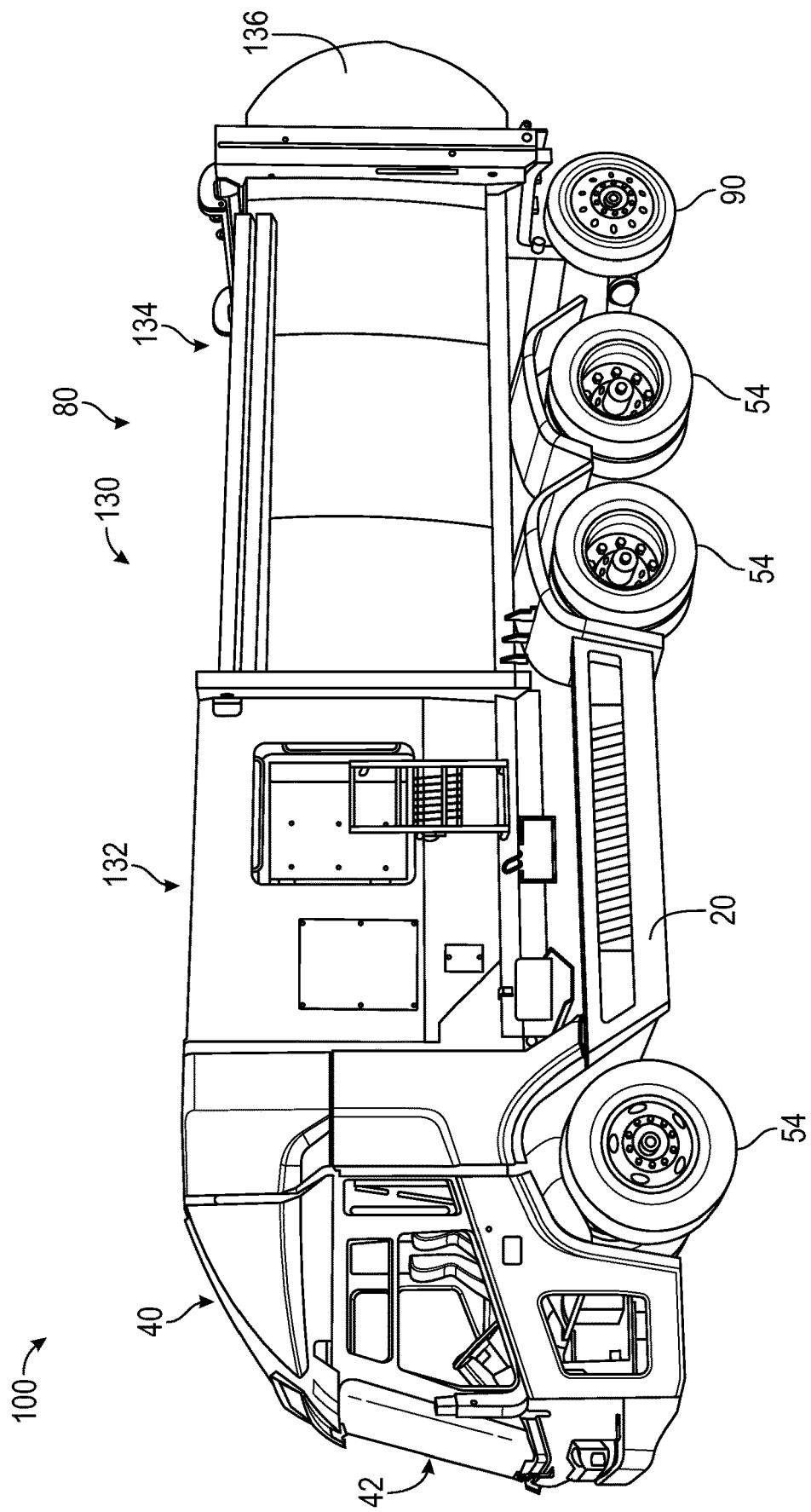
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
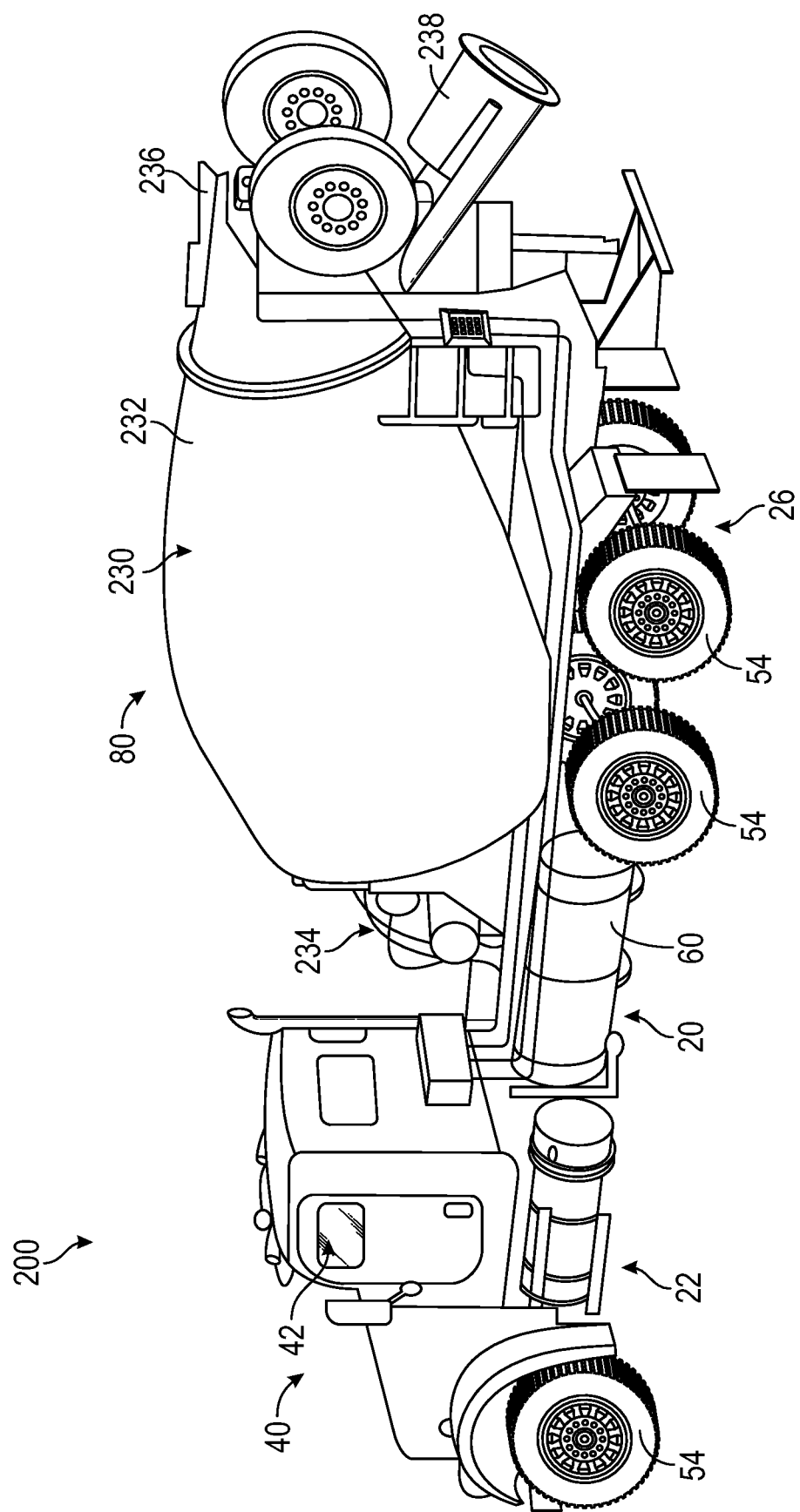
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
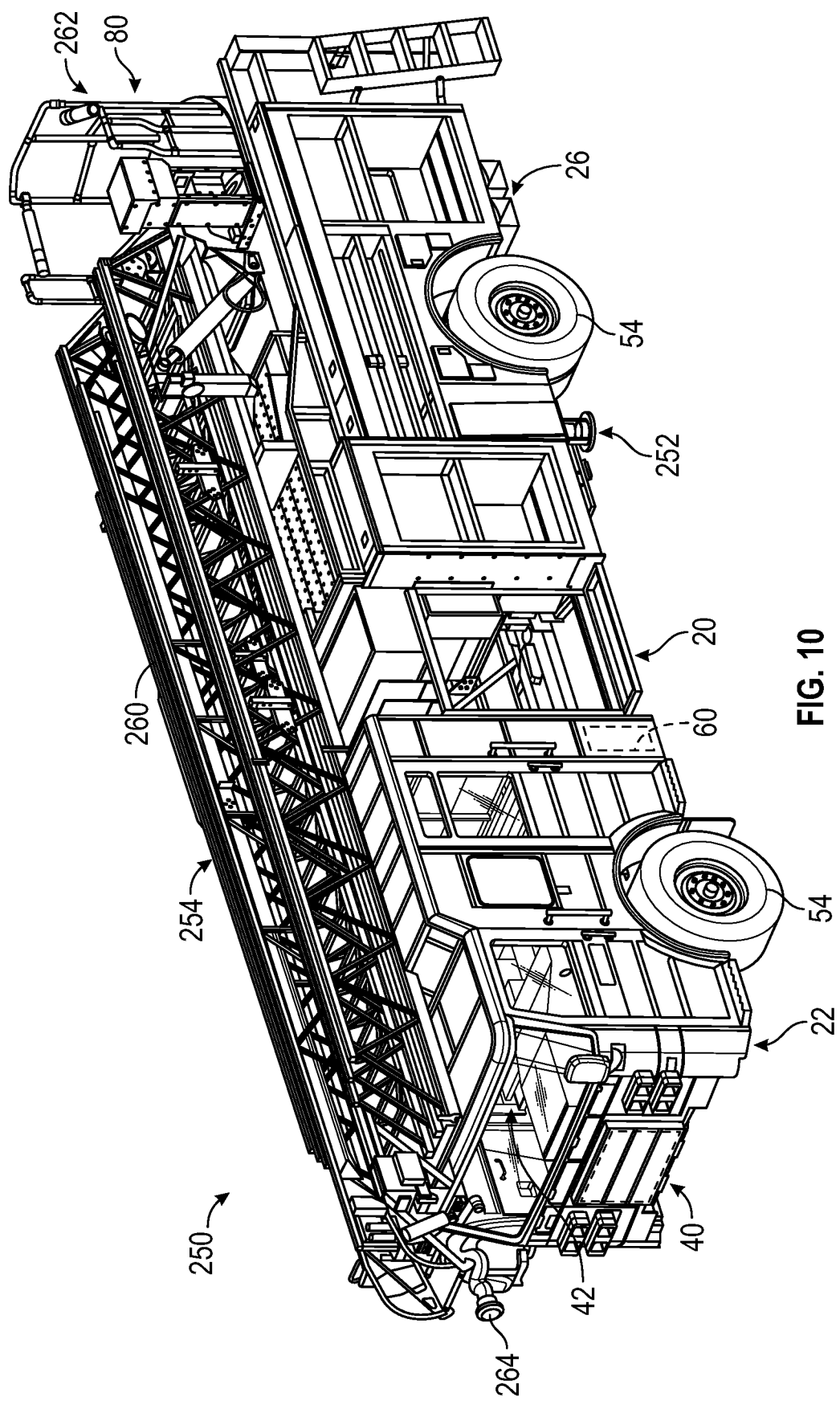
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
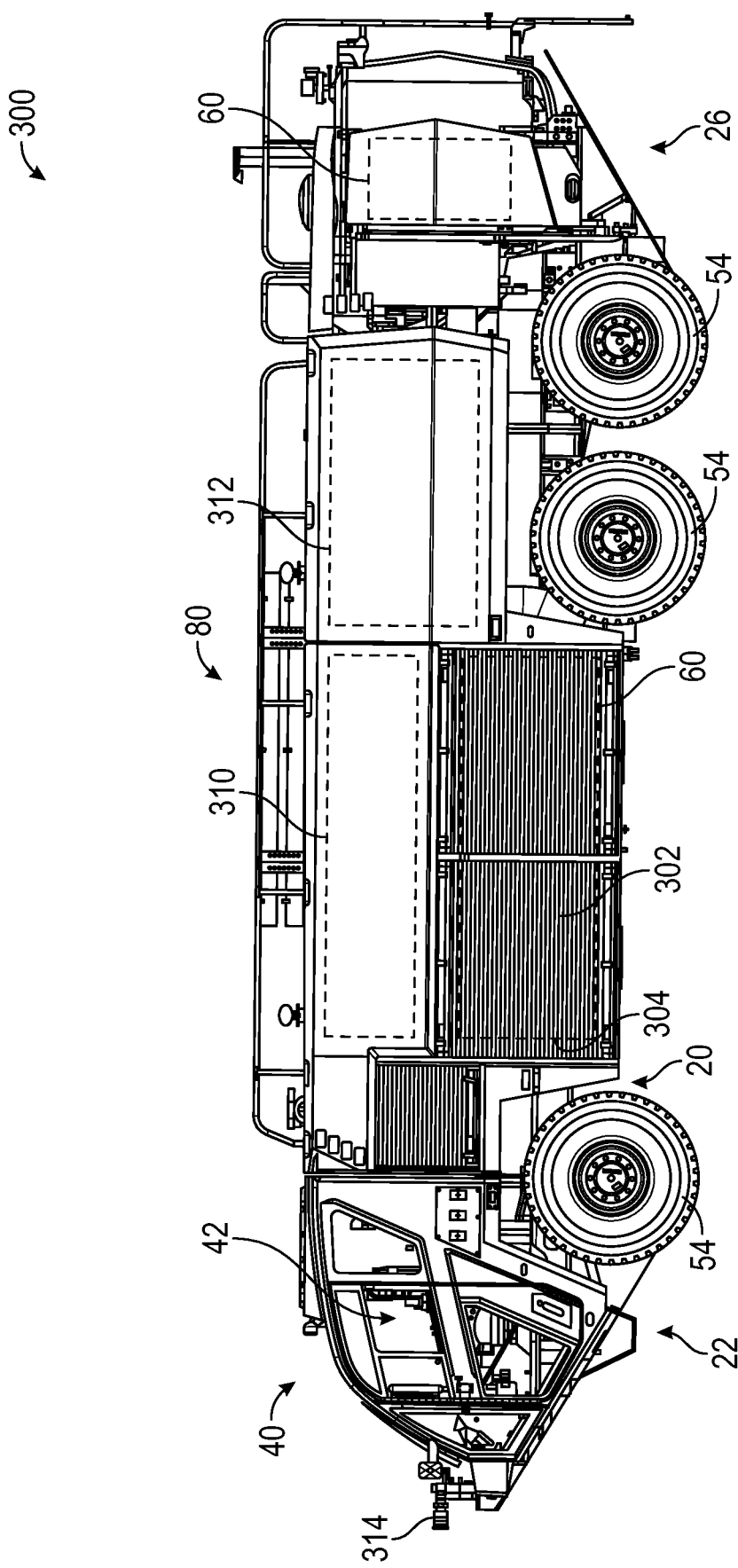
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
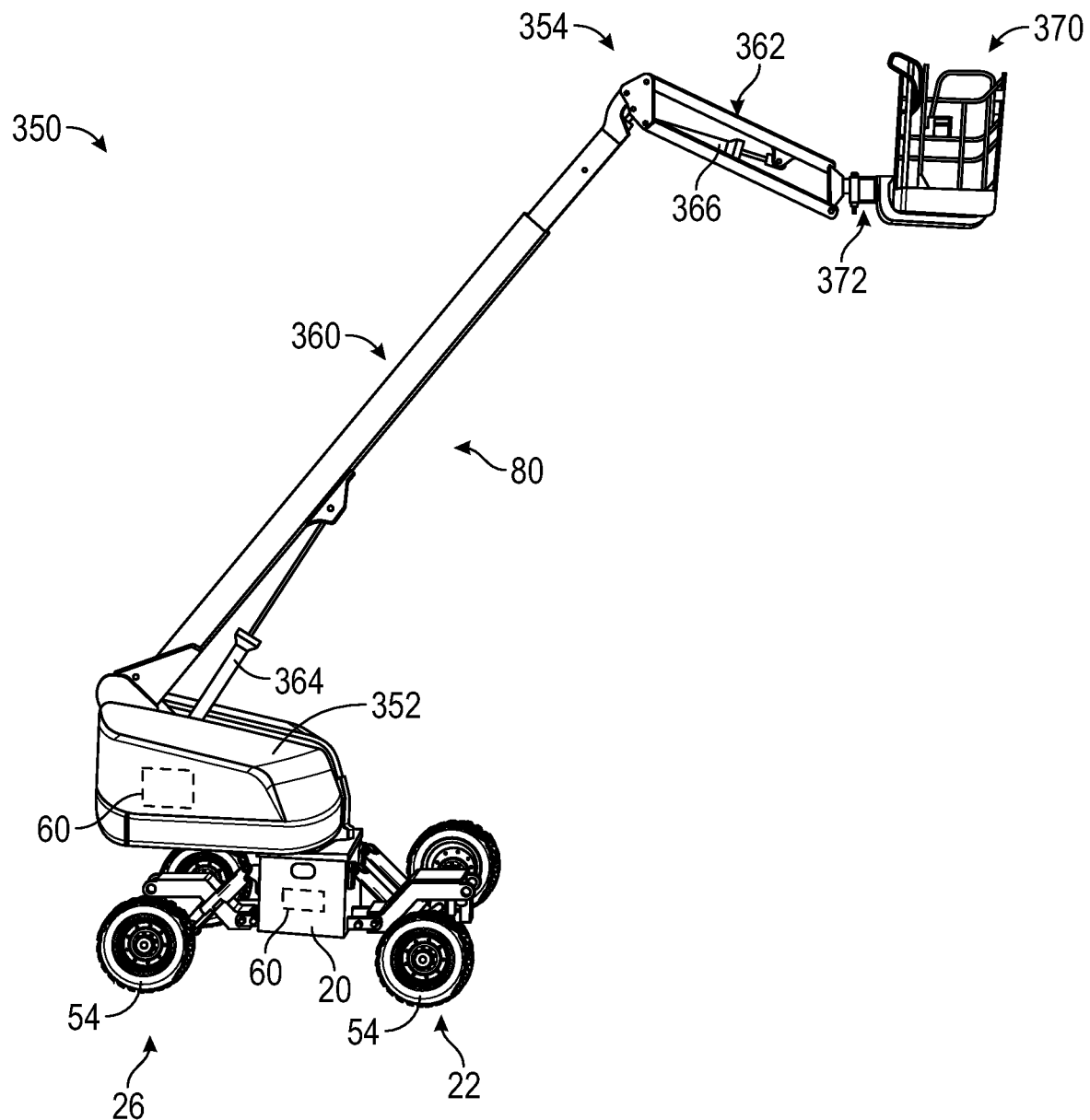
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
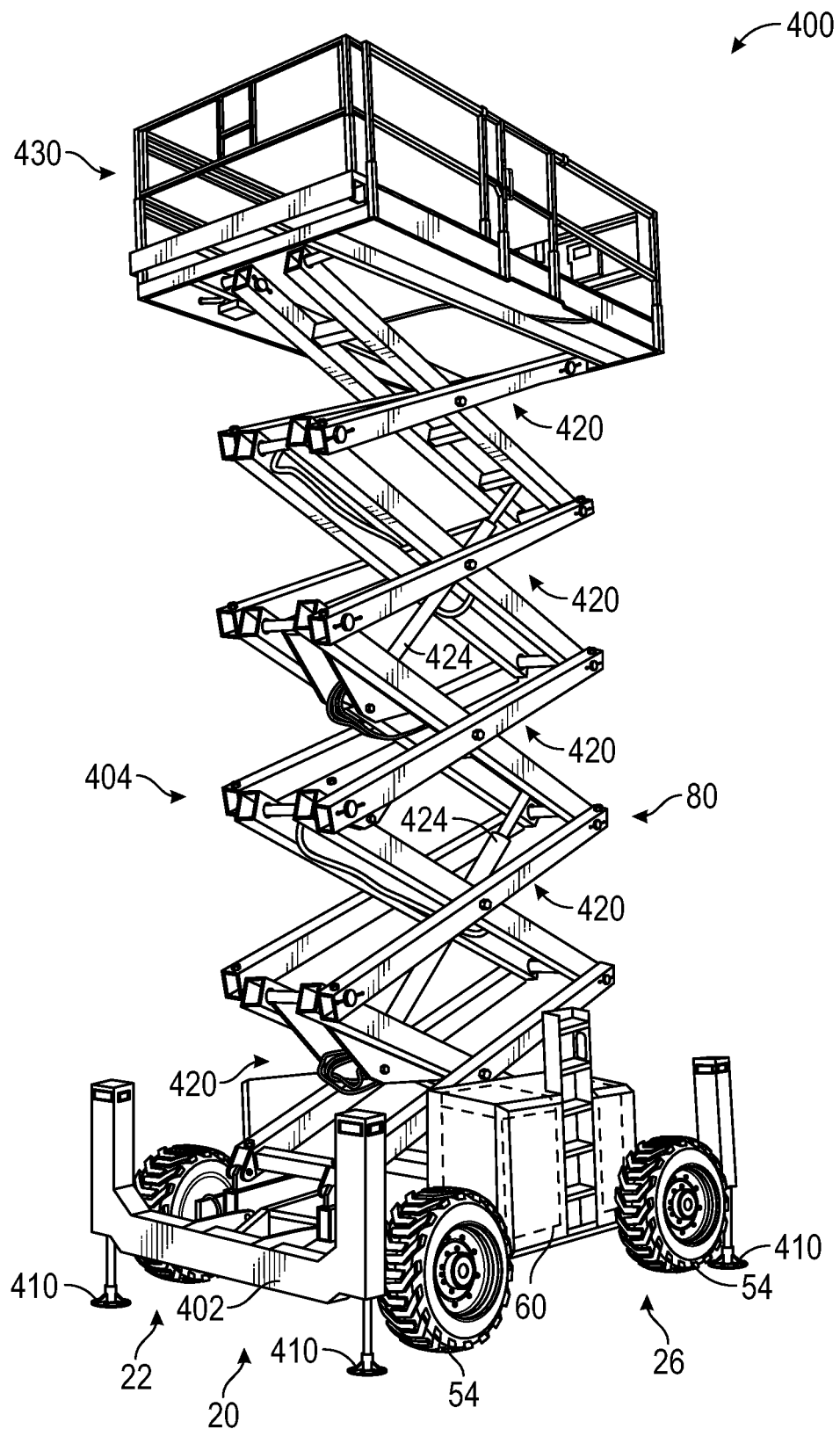
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Delivery Charger

As shown in FIGS. 14-28, the vehicle 10 includes an APU, shown as delivery charger 500. According to an exemplary embodiment, the delivery charger 500 facilitates driving the vehicle 10 over greater delivery distances (e.g., distances greater than the range provided by the batteries 60 on a single charge) without needing to follow specific routes for charging purposes, which (i) can allow for a more efficient route to be taken because the chosen route does not need to be dependent upon the location of fixed charging stations along the route and (ii) can save on overall transportation/delivery time.

As shown in FIGS. 14, 21, 22, and 26, the delivery charger 500 includes (i) a main body portion or support structure, shown as housing 510, (ii) a power generation unit or electrical energy source, shown as power generator 520, disposed within the housing 510, (iii) a fuel source, shown as fuel tank 530, disposed within the housing 510, and (iv) a fuel connector, shown as fuel line 540, fluidly coupling the fuel tank 530 to the power generator 520 to facilitate providing a fuel from the fuel tank 530 to the power generator 520 to facilitate operation of the power generator 520. In other embodiments, the housing 510 is replaced with a pallet or flat support structure to which the power generator 520 and the fuel tank 530 are coupled or otherwise secured (e.g., with fasteners, clamps, straps, etc.).

According to an exemplary embodiment, the power generator 520 is configured to consume or otherwise utilize the fuel provided by the fuel tank 530 to generate electricity to charge the batteries 60 of the vehicle 10. In some embodiments, such charging is capable of being performed by the delivery charger 500 while the vehicle 10 is moving. In some embodiments, such charging by the delivery charger 500 is limited to when the vehicle 10 is stationary. In one embodiment, the power generator 520 includes a prime mover and an electromagnetic device (e.g., an alternator) driven by the prime mover to generate electricity (e.g., a genset). In such an embodiment, the prime mover may be an internal combustion engine (e.g., a spark-ignition engine, a compression-ignition engine, etc.) and the fuel tank 530 may be a combustible fuel tank configured to store a combustible fuel (e.g., gasoline, diesel, natural gas, propane, etc.). In another embodiment, the power generator 520 is a fuel cell and the fuel tank 530 is a hydrogen tank configured to store hydrogen where the fuel cell receives the hydrogen from the hydrogen tank to perform an electrochemical reaction to generate electricity. In still another embodiment, the power generator 520 and the fuel tank 530 are replaced with supplementary batteries to temporarily increase the electrical storage capacity of the vehicle 10 (e.g., a battery range extender). In such an embodiment, the delivery charger 500 may include one or more solar panels that can be positioned on and/or about the vehicle 10 to charge the supplementary batteries of the delivery charger 500 as the vehicle 10 is being driven or while stationary. Alternatively, the solar panels may be directly connectable to the batteries 60, or both the batteries 60 and the supplementary batteries.

Figure 14:
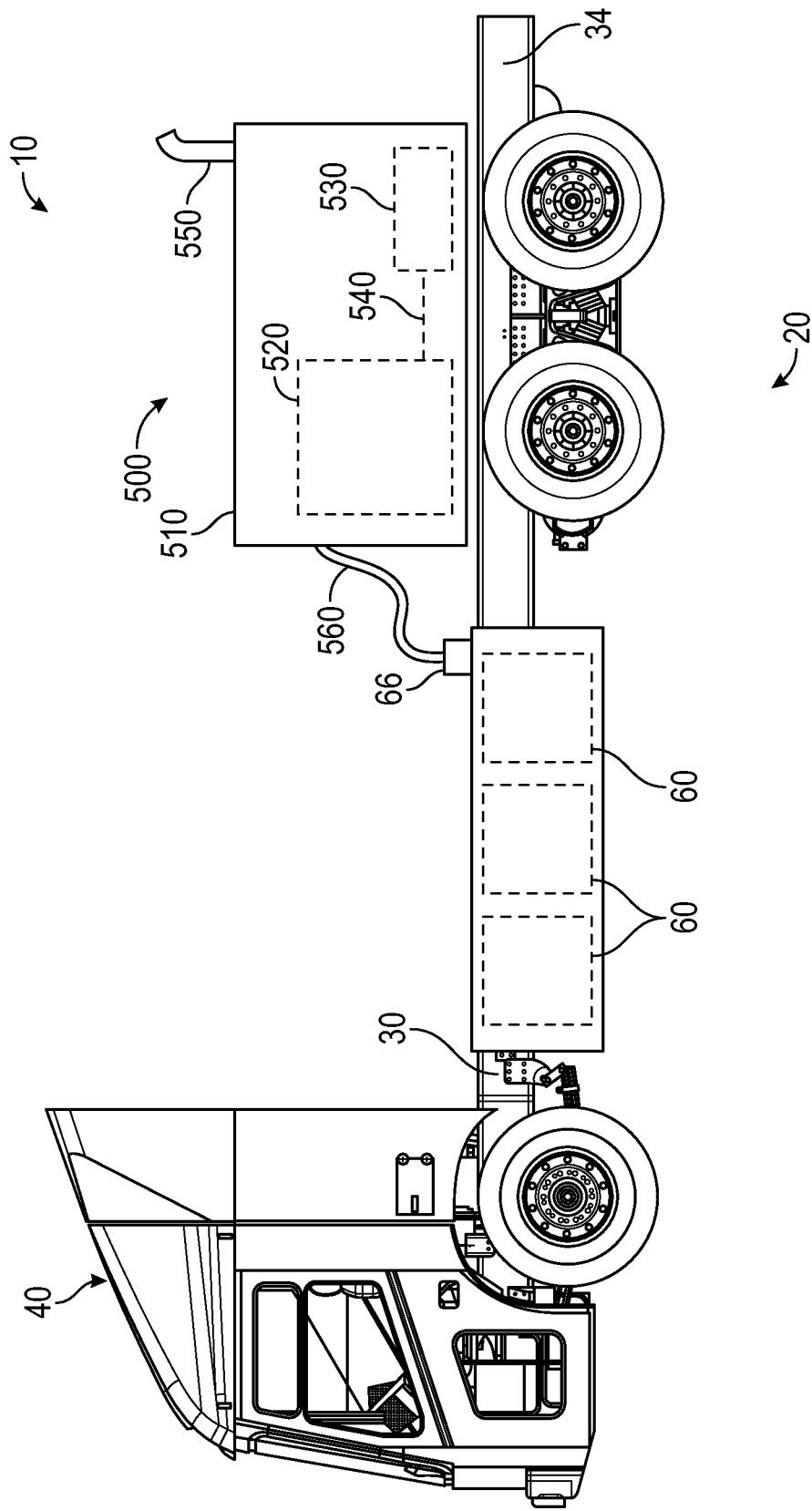
FIG. 14 is a side view of the vehicle of FIG. 1 including an auxiliary power unit coupled to a chassis thereof, according to an exemplary embodiment.
Figure 21:
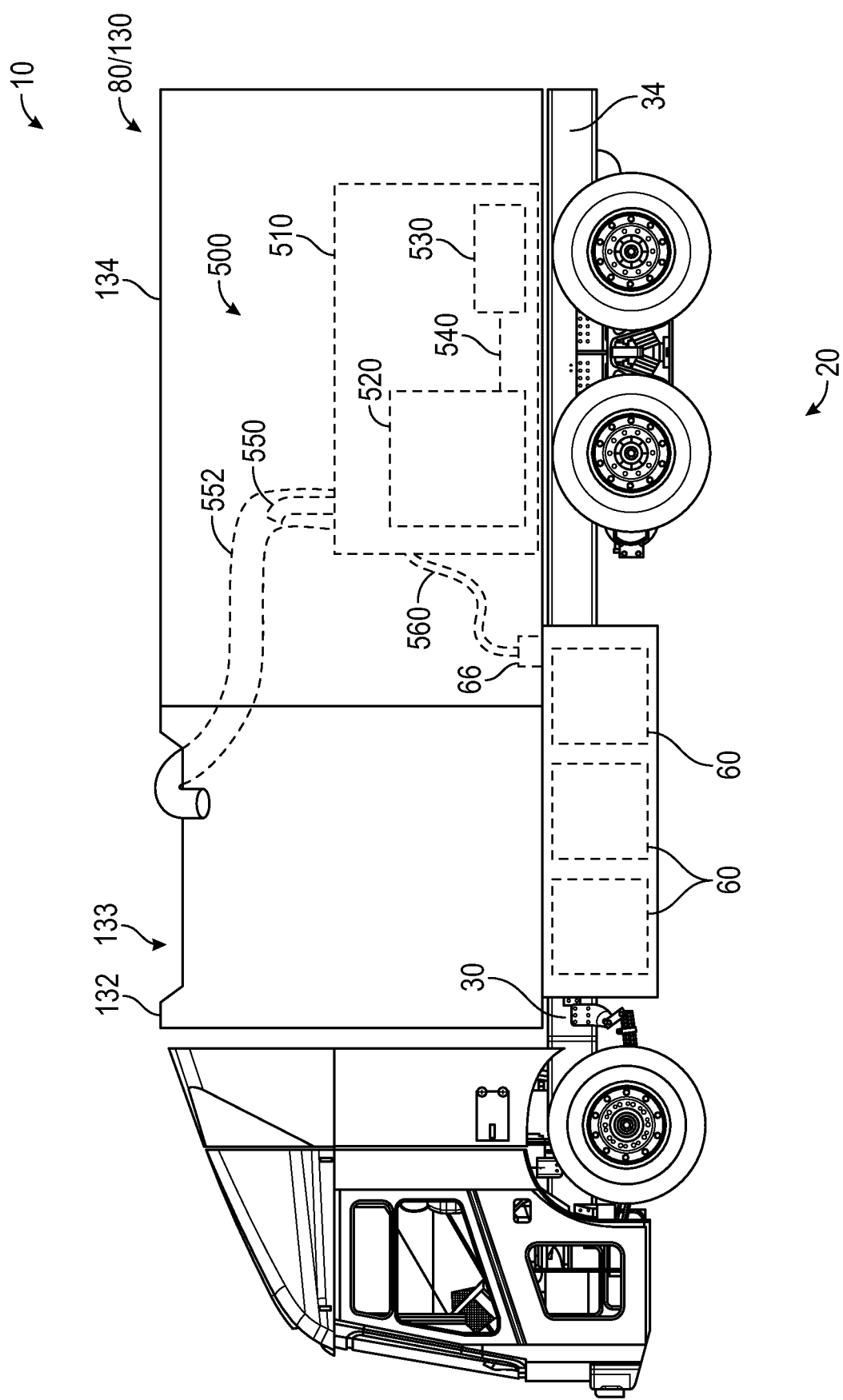
FIG. 21 is a side view of the vehicle of FIG. 1 including an auxiliary power unit coupled to a body thereof, according to an exemplary embodiment.
Figure 22:
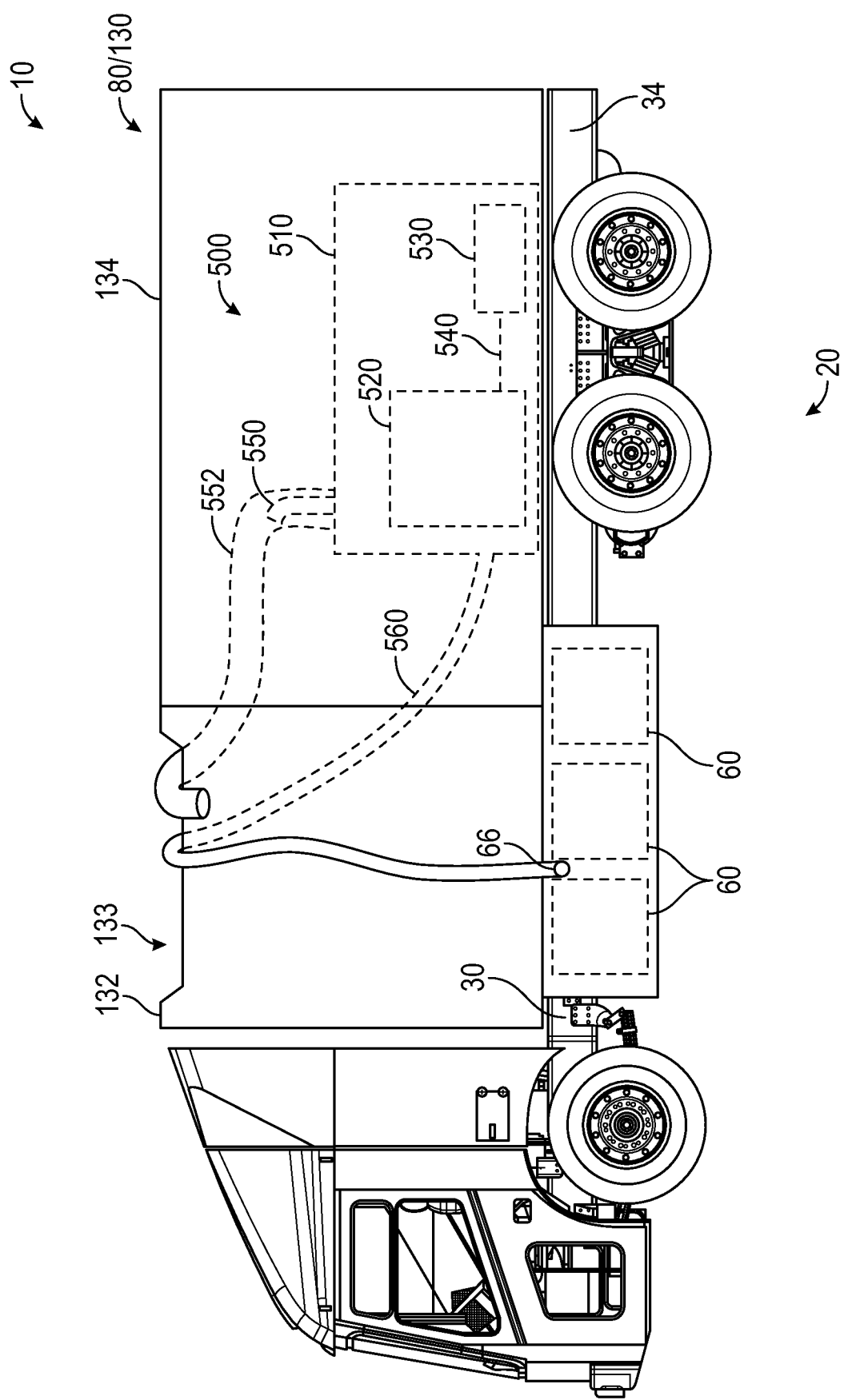
FIG. 22 is a side view of the vehicle of FIG. 1 including an auxiliary power unit coupled to a body thereof, according to another exemplary embodiment.

As shown in FIGS. 14, 21, and 22, the delivery charger 500 includes an exhaust system, shown as exhaust 550. According to an exemplary embodiment, the exhaust 550 is coupled to the power generator 520 and configured to expel byproducts (e.g., water if a fuel cell, exhaust gases such as NOx and particulates if an internal combustion engine, etc.) of the electrical generation process performed by the power generator 520. In some embodiments, the exhaust 550 includes one or more exhaust aftertreatment components (e.g., catalysts, catalytic converters, selective catalytic reduction catalysts, a diesel particulate filters, sensors, etc.) that are configured to at least partially purify or otherwise cleanse the byproducts and/or monitor characteristics of the byproducts.

As shown in FIGS. 14, 21, 22, and 28, the delivery charger 500 includes an electrical connector, shown as charge cable 560. According to an exemplary embodiment, the charge cable 560 extends from the power generator 520 and engages with the batteries 60 through a charging interface, shown as charge port 66, electrically coupled to the batteries 60. The power generator 520, therefore, can charge the batteries 60 via the charge cable 560 and the charge port 66. According to the various exemplary embodiments shown in FIGS. 14-28, the delivery charger 500 can be variously mounted to the vehicle 10 and connected to batteries 60 of the charge port 66.

A. Chassis Mounted Delivery Charger

As shown in FIGS. 14-20, the delivery charger 500 is coupled to or mounted directly on the chassis 20 of the vehicle 10. As shown in FIG. 14, the charge port 66 is positioned along the housing of the batteries 60. In other embodiments, the charge port 66 is otherwise positioned. According to an exemplary embodiment, coupling the delivery charger 500 to the chassis 20 is useful when the vehicle 10 is manufactured or assembled at multiple, distant locations. By way of example, (i) the chassis 20, the cab 40, and the batteries 60 may be assembled in a first location and (ii) the application kit 80 (e.g., the refuse compartment 130, etc.) may be added onto the chassis 20 after the vehicle 10 is transported to a second location. In such instances, the delivery charger 500 may be installed onto the chassis 20 to facilitate driving the vehicle 10 an extended distance (i.e., a distance greater than the range capability of the batteries 60 on a single charge) to reach the second location where the application kit 80 may be located to facilitate installation of the application kit 80 onto the chassis 20 (i) without requiring the vehicle 10 to be towed or otherwise shipped from the first location to the second location or (ii) without requiring a specific route plan to ensure charging stations are located at acceptable intervals along the route to maintain a charge for the entire route (i.e., so that the vehicle 10 does not become stranded along the route).

Figure 15:
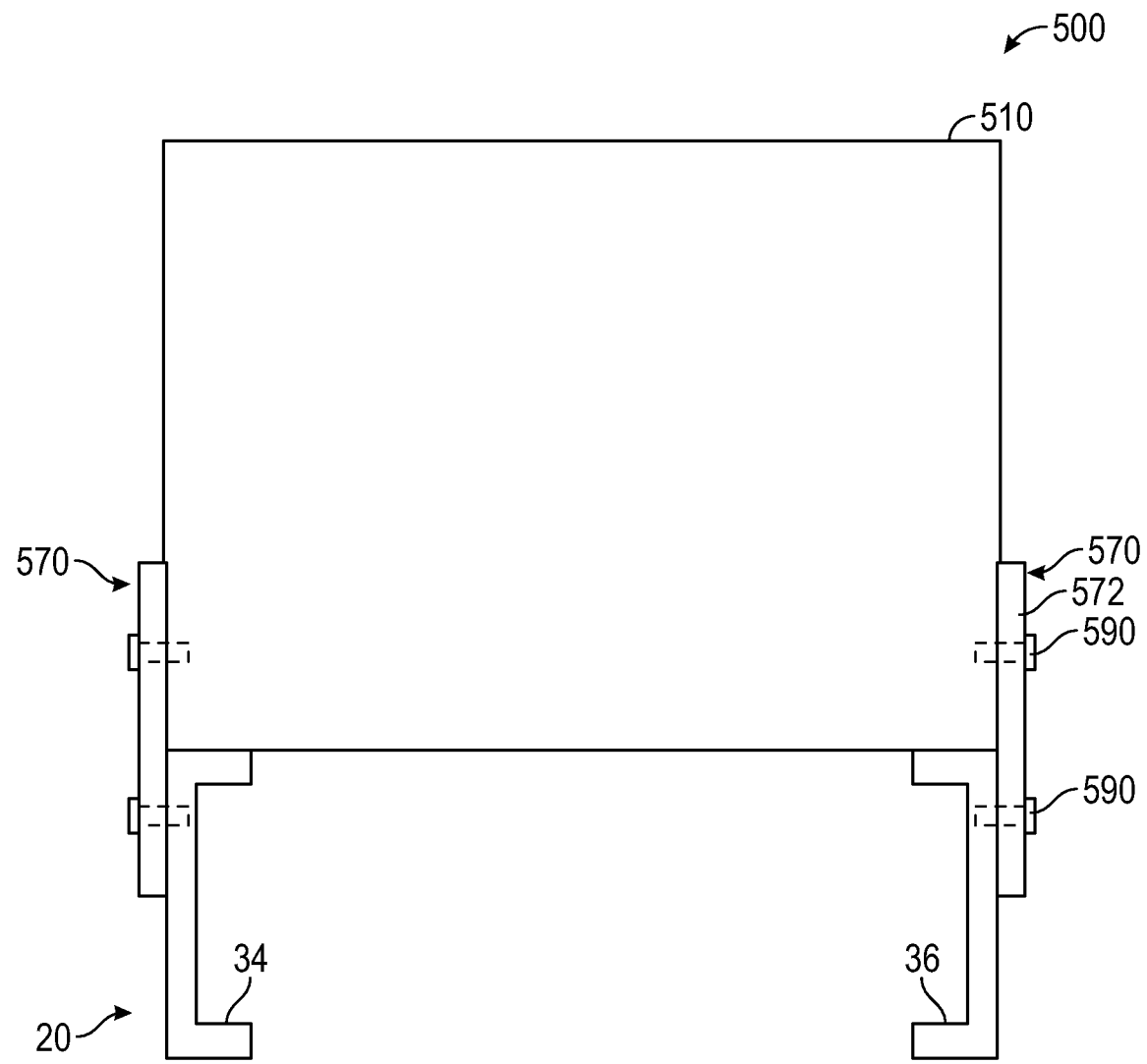
FIGS. 15-20 are various rear views of the auxiliary power unit and the chassis of FIG. 14, according to various exemplary embodiments.

As shown in FIGS. 15-20, the delivery charger 500 includes an attachment assembly, shown as mounting assembly 570, configured to facilitate coupling or mounting the delivery charger 500 to the rear rail portions 34, 36 of the chassis 20. As shown in FIG. 15, (i) a bottom surface of the housing 510 of the delivery charger 500 is disposed along an upper surface of the rear rail portions 34, 36 of the chassis 20 and (ii) the mounting assembly 570 includes a pair of plates, shown as side plates 572, extending along and between the sidewalls of the housing 510 and the sidewalls of the rear rail portions 34, 36 of the chassis 20. The side plates 572 are coupled to the housing 510 and the rear rail portions 34, 36 of the chassis 20 using a plurality of fasteners (e.g., bolts, clamps, straps, etc.), shown as fasteners 590, thereby releasably coupling the delivery charger 500 to the chassis 20.

Figure 16:
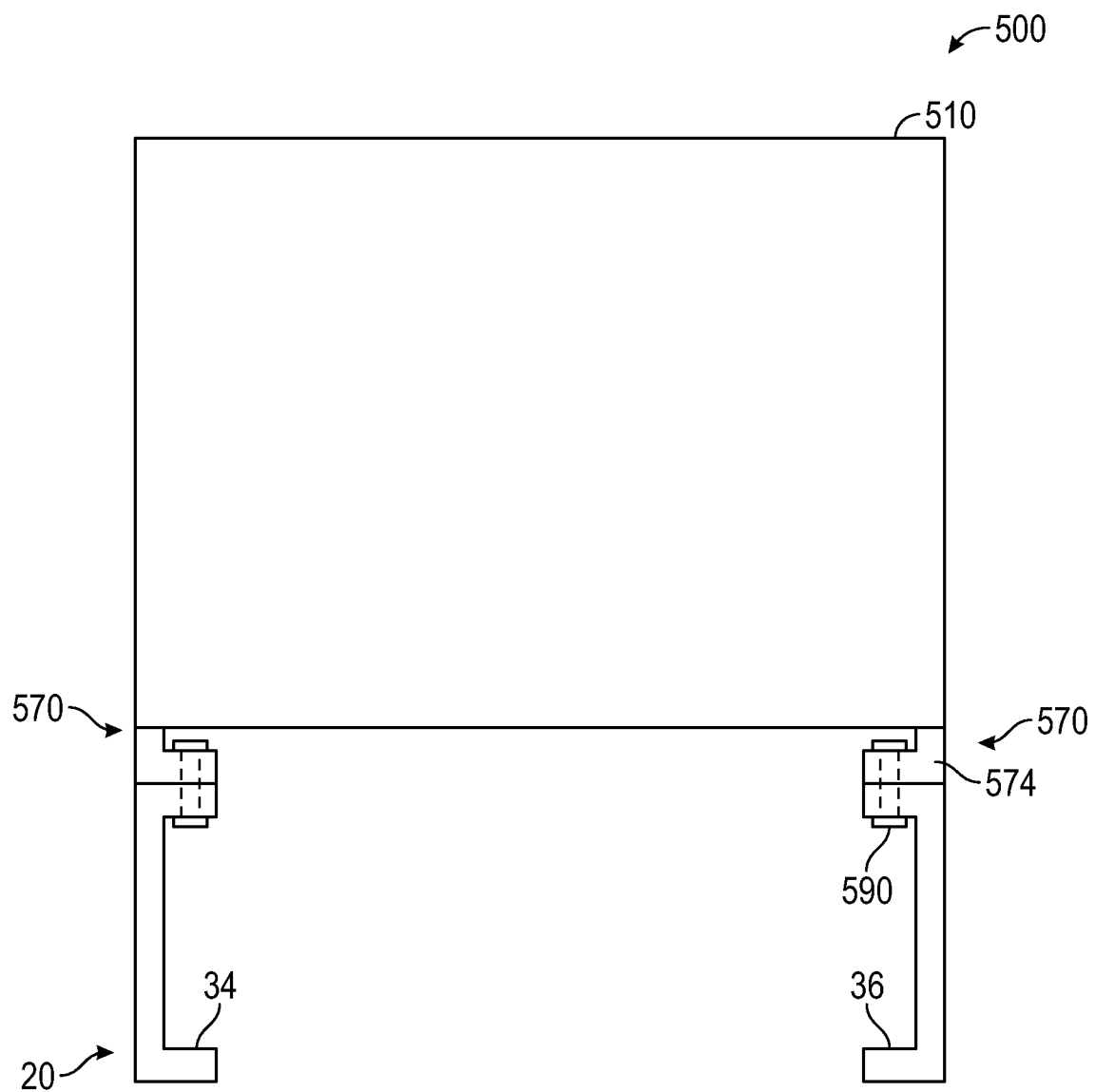
Figure 17:
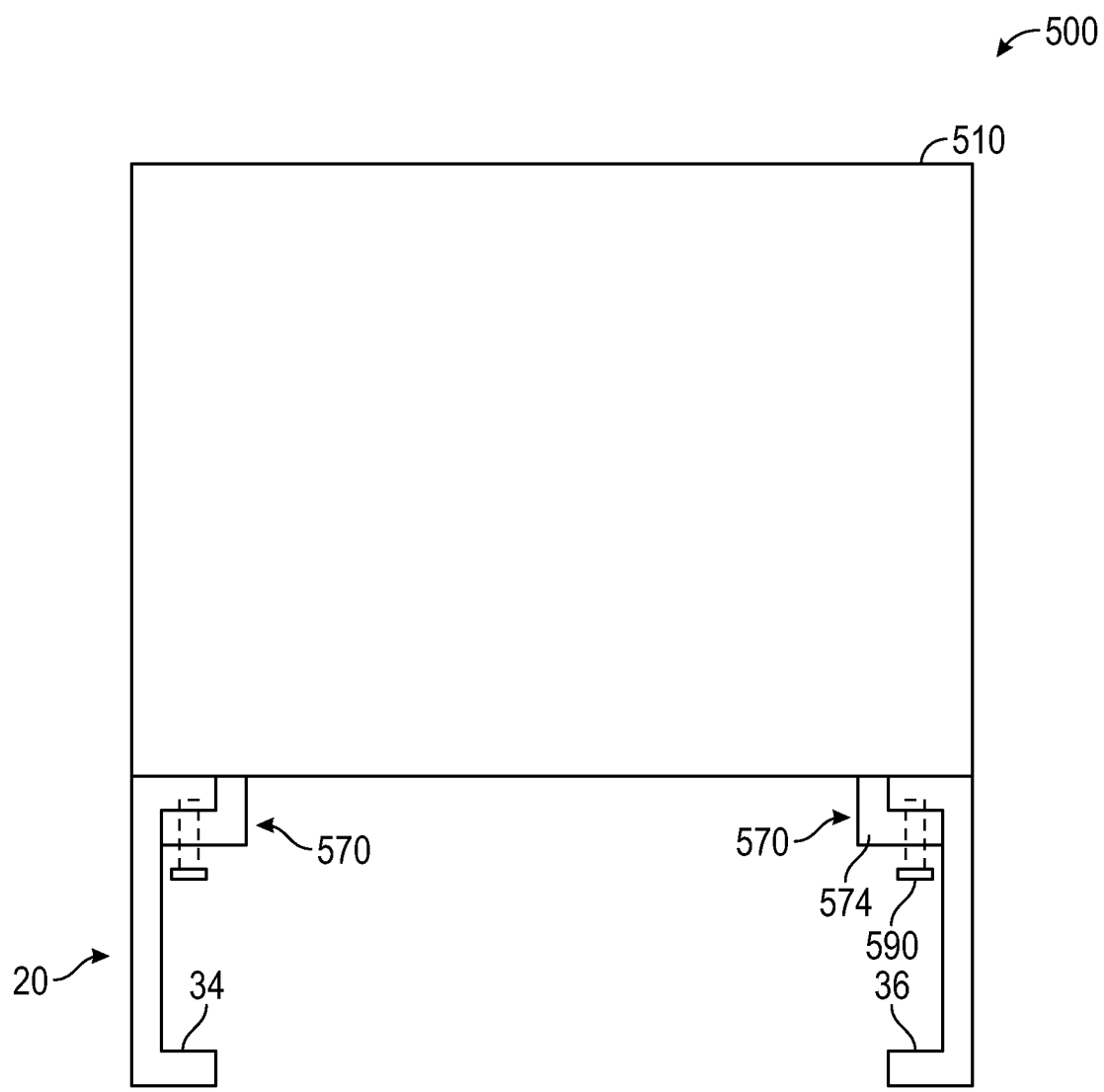

As shown in FIGS. 16 and 17, the mounting assembly 570 includes a first plurality of brackets or feet, shown as feet 574, coupled to and extending from the bottom surface of the housing 510. As shown in FIG. 16, the feet 574 engage with the upper surface of the rear rail portions 34, 36 of the chassis 20 and are coupled thereto with the fasteners 590, thereby releasably coupling the delivery charger 500 to the chassis 20. As shown in FIG. 17, the feet 574 hook or extend underneath an upper flange of the rear rail portions 34, 36 of the chassis 20 (e.g., having a "C" shape) and are coupled thereto with the fasteners 590, thereby releasably coupling the delivery charger 500 to the chassis 20.

Figure 18:
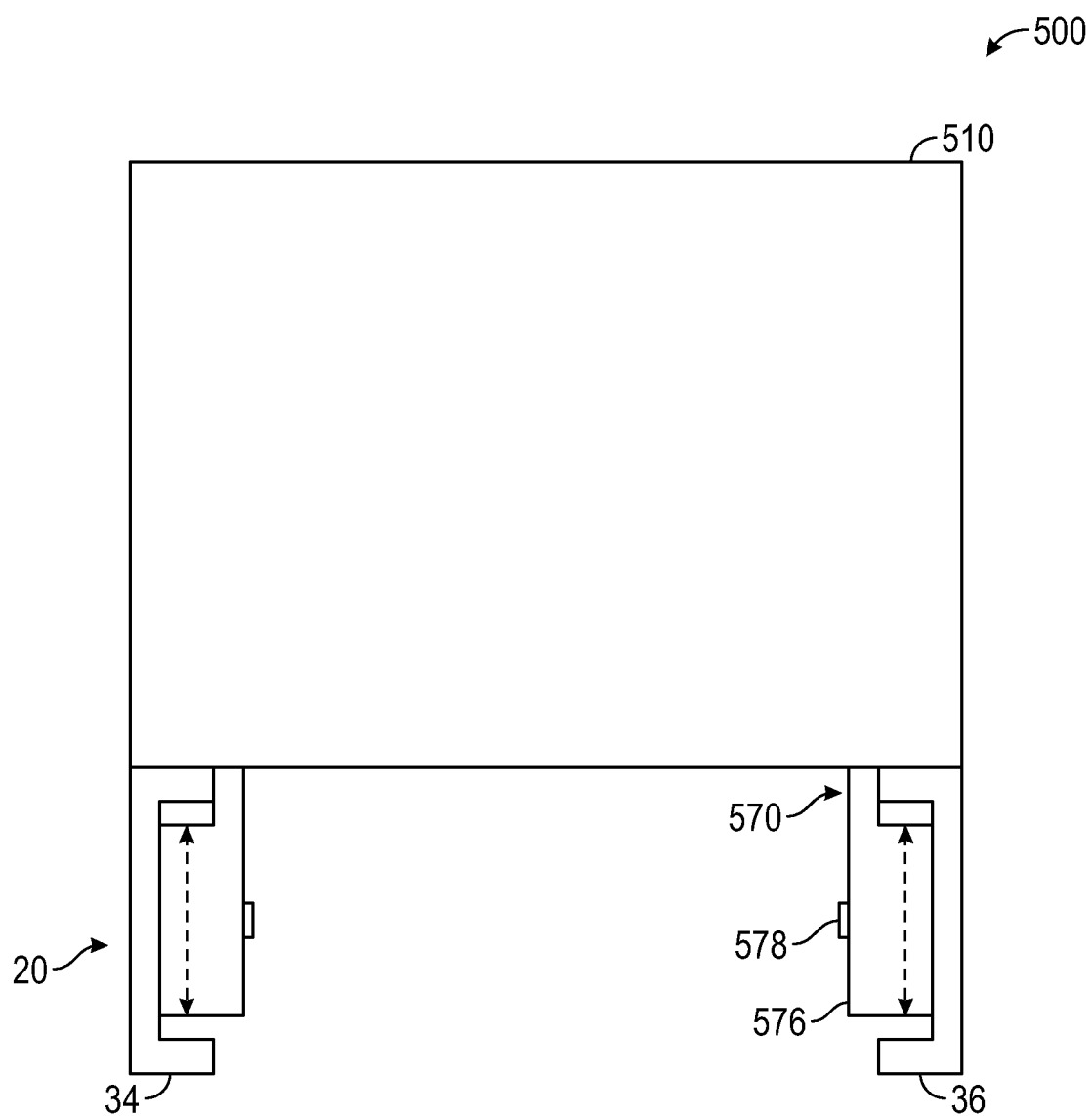
Figure 19:
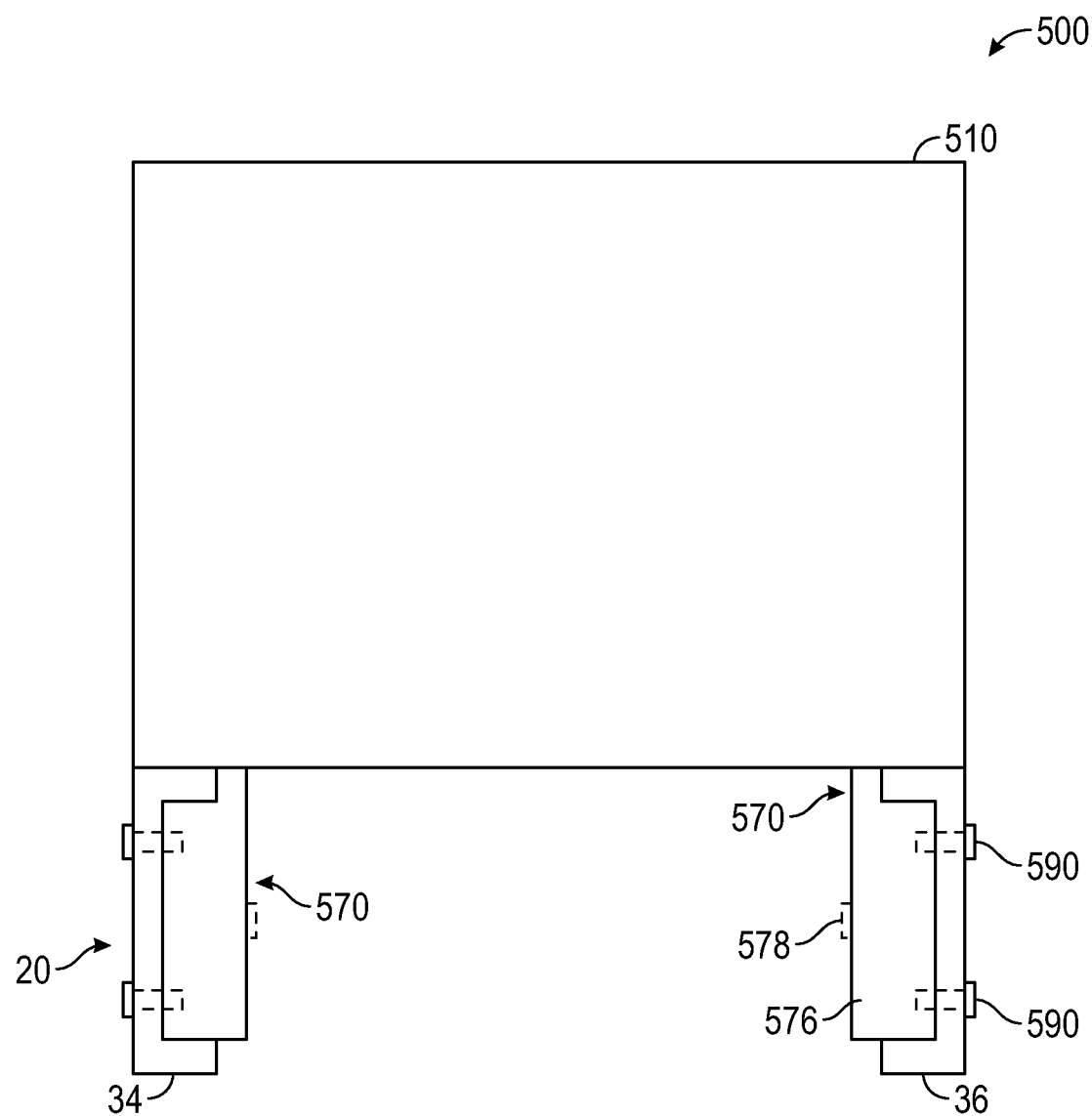

As shown in FIGS. 18 and 19, the mounting assembly 570 includes a second plurality of brackets or feet, shown as feet 576, coupled to and extending from the bottom surface of the housing 510 and having adjusters, shown as feet adjusters 578. As shown in FIG. 18, the feet 574 extend downward and are received within an interior portion of the rear rail portions 34, 36 of the chassis 20 (e.g., having a "C" shape), with a gap present between at least one of (i) an upper flange of the rear rail portions 34, 36 and the feet 576 or (ii) a lower flange of the rear rail portions 34, 36 and the feet 576. As shown in FIG. 19, the feet 576, after the delivery charger 500 is properly slid along the chassis 20, are expanded by engaging the adjuster 578 such that the feet 578 engage with the upper flange and the lower flange of the rear rail portions 34, 36, thereby releasably coupling the delivery charger 500 to the chassis 20. Accordingly, the feet 576 of FIGS. 18 and 19 may be configured as adjustable or expandable feet. In other embodiments, the feet 576 are not adjustable or expandable, but rather the feet 576 are sized to substantially extend between the upper flange and the lower flange of the rear rail portions 34, 36. In such embodiments, the feet 576 may be coupled to the rear rail portions 34, 36 via the fasteners (like shown in FIG. 19).

Figure 20:
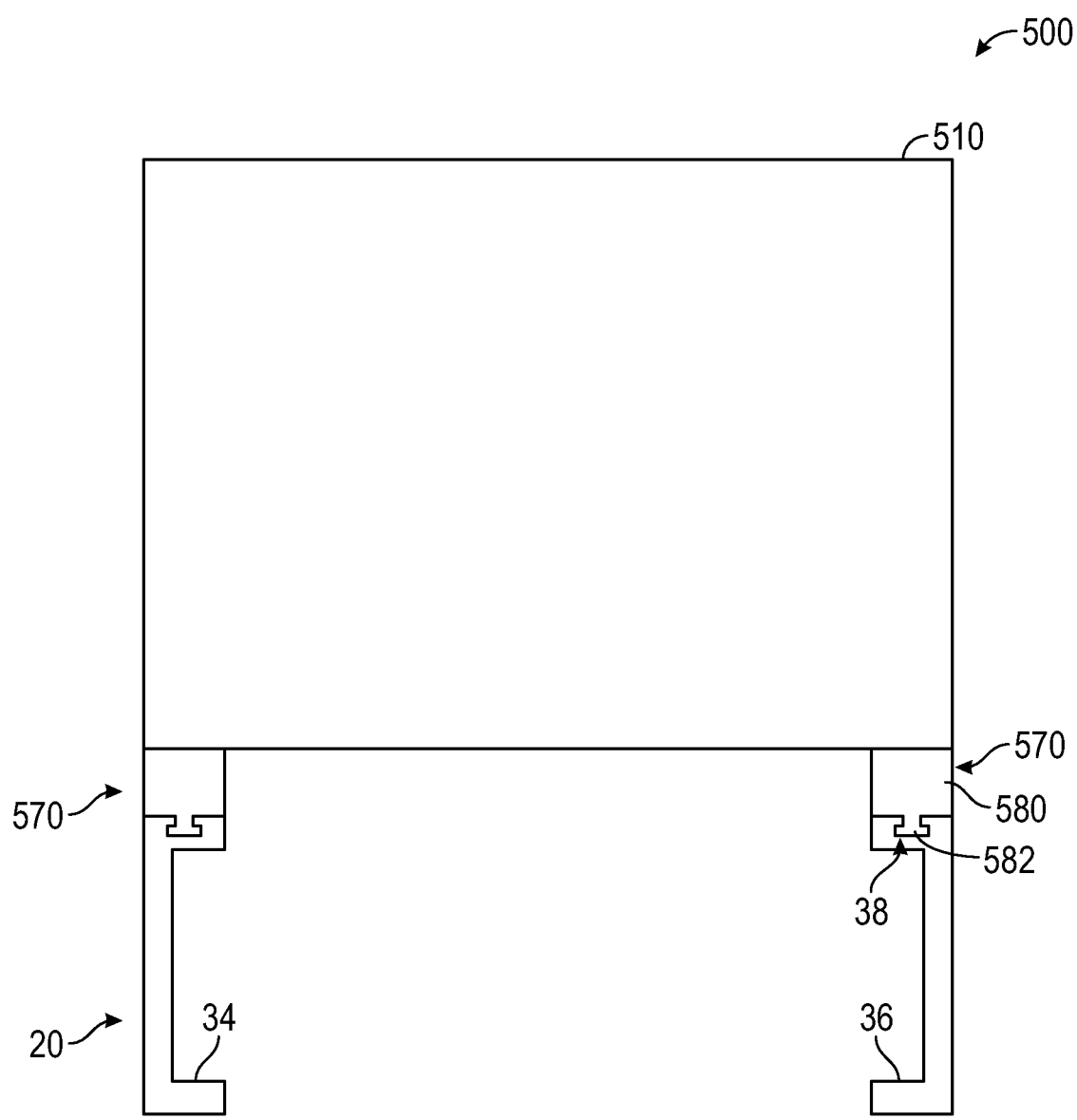

As shown in FIG. 20, the mounting assembly 570 includes a third plurality of brackets or feet, shown as feet 580, coupled to and extending from the bottom surface of the housing 510. The feet 580 include a retainer, shown key 582, that interfaces with a passage or guide, shown as channel 38, defined in the upper flanges of the rear rail portions 34, 36. In other embodiments, the feet 580 define the channels 38 and the upper flanges of the rear rail portions 34, 36 include the keys 582. According to an exemplary embodiment, the keys 582 are received within the channels 38, which permits sliding the delivery charger 500 along the chassis 20. Once is a desired position, the delivery charger 500 can be secured in place (e.g., using clamps, fasteners, straps, etc.). The keys 582 and the channels 38, thereby, facilitate releasably and slidably coupling the delivery charger 500 to the chassis 20.

B. Body Mounted Delivery Charger

As shown in FIGS. 21-25, the delivery charger 500 is coupled to or mounted inside of the application kit 80 of the vehicle 10, which is shown as the refuse compartment 130 in this particular instance. According to an exemplary embodiment, coupling the delivery charger 500 to or within the application kit 80 is useful after the application kit 80 is coupled to the chassis 20 and the vehicle 10 needs to be delivered to an end user over an extended distance. In such instances, the delivery charger 500 may be installed onto or into the application kit 80 to facilitate driving the vehicle 10 an extended distance (i.e., a distance greater than the range capability of the batteries 60 on a single charge) to reach the delivery location (i) without requiring the vehicle 10 to be towed or otherwise shipped to the delivery location or (ii) without requiring a specific route plan to ensure charging stations are located at acceptable intervals along the route to maintain a charge for the entire route (i.e., so that the vehicle 10 does not become stranded along the route).

Specifically, as shown in FIGS. 21-25, the delivery charger 500 is disposed within the storage volume 134 of the refuse compartment 130. As shown in FIGS. 21 and 22, the delivery charger 500 includes a conduit, shown as exhaust vent conduit 552, that interfaces with the exhaust 550 and extends through the storage volume 134, into the hopper volume 132, and out of a hopper inlet 133 of the hopper volume 132 to facilitate exhausting exhaust gases out of the refuse compartment 130 during use of the delivery charger 500. Alternatively, the tailgate 136 of the refuse compartment 130 may be opened during use of the delivery charger 500 (e.g., when the vehicle 10 is stationary). As shown in FIG. 21, the charge port 66 extends into the refuse compartment 130 and is accessible from an interior of the refuse compartment 130 to provide easy hookup and connection of the delivery charger 500 to the batteries 60 via the charge cable 560. As shown in FIG. 22, the charge port 66 is positioned external to the refuse compartment 130 and, therefore, the delivery charger 500 is connected to the batteries 60 by running the charge cable 560 through the storage volume 134, into the hopper volume 132, out of the hopper inlet 133, and to the charge port 66. Alternatively, the delivery charger 500 may be connected to the batteries 60 by running the charge cable 560 out the back of the refuse compartment 130 when the tailgate 136 is open and to the charge port 66.

Figure 23:
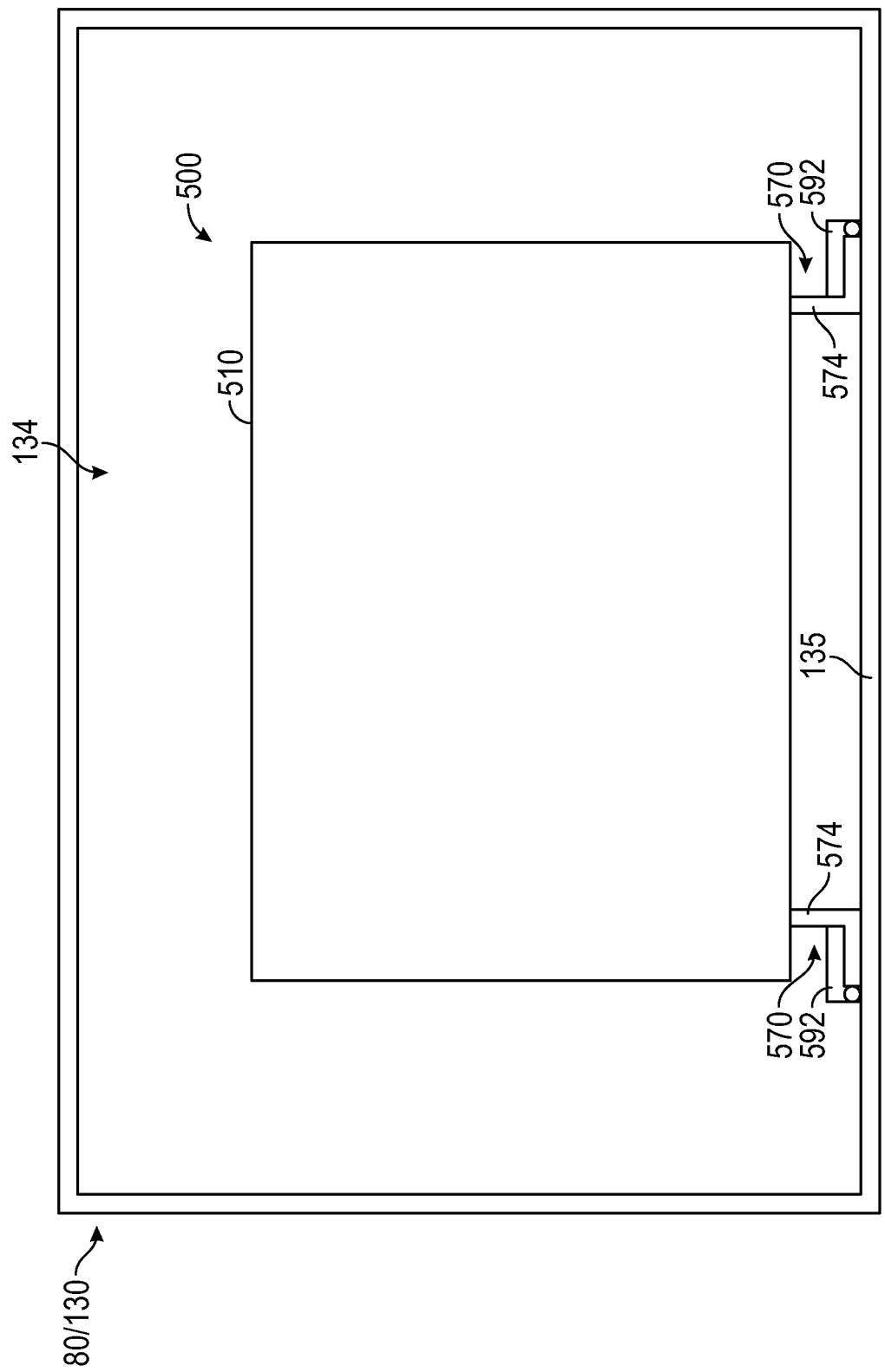
FIGS. 23-25 are various rear views of the auxiliary power unit and the body of FIGS. 21 and 22, according to various exemplary embodiments.
Figure 24:
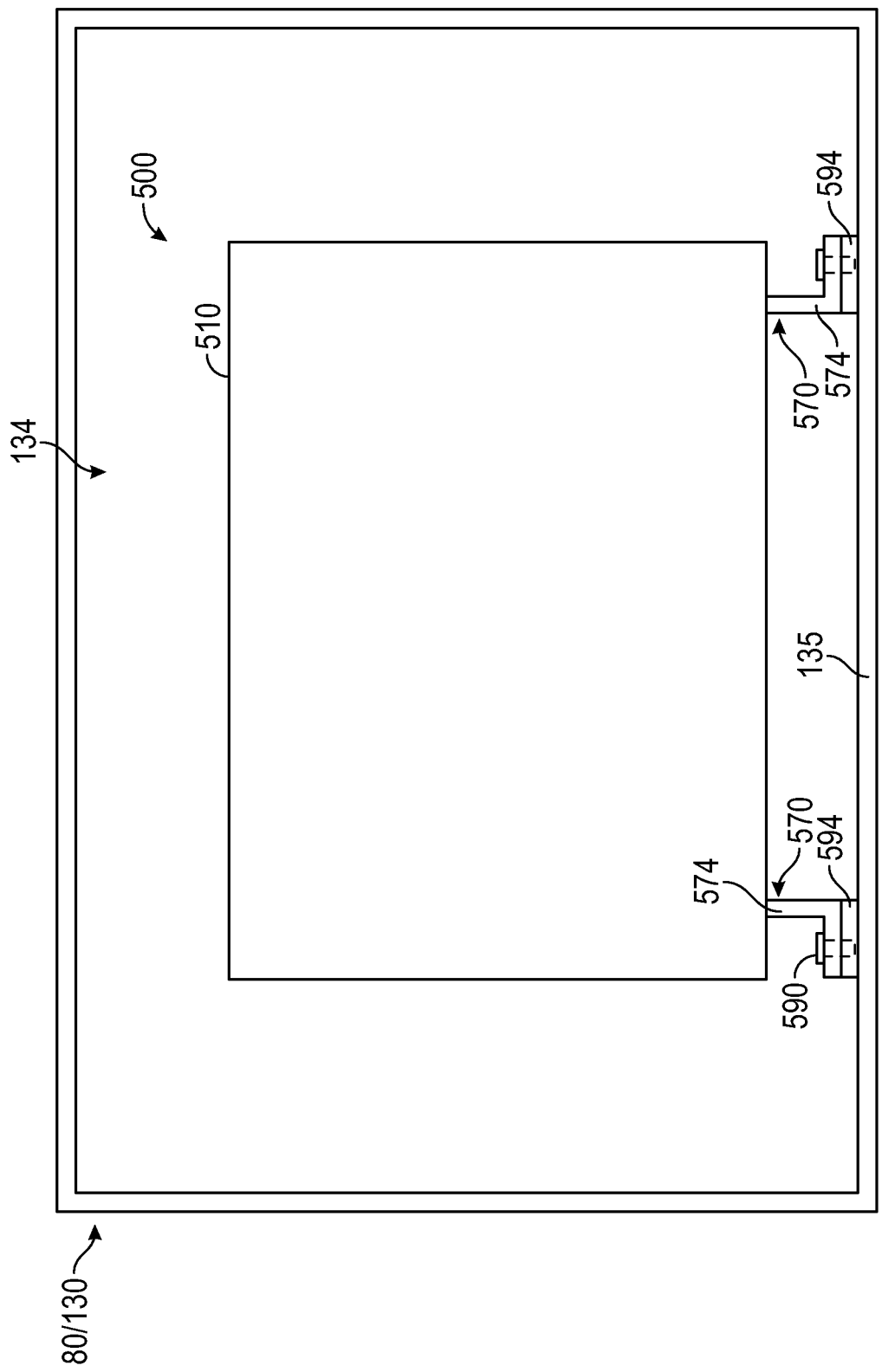
Figure 25:
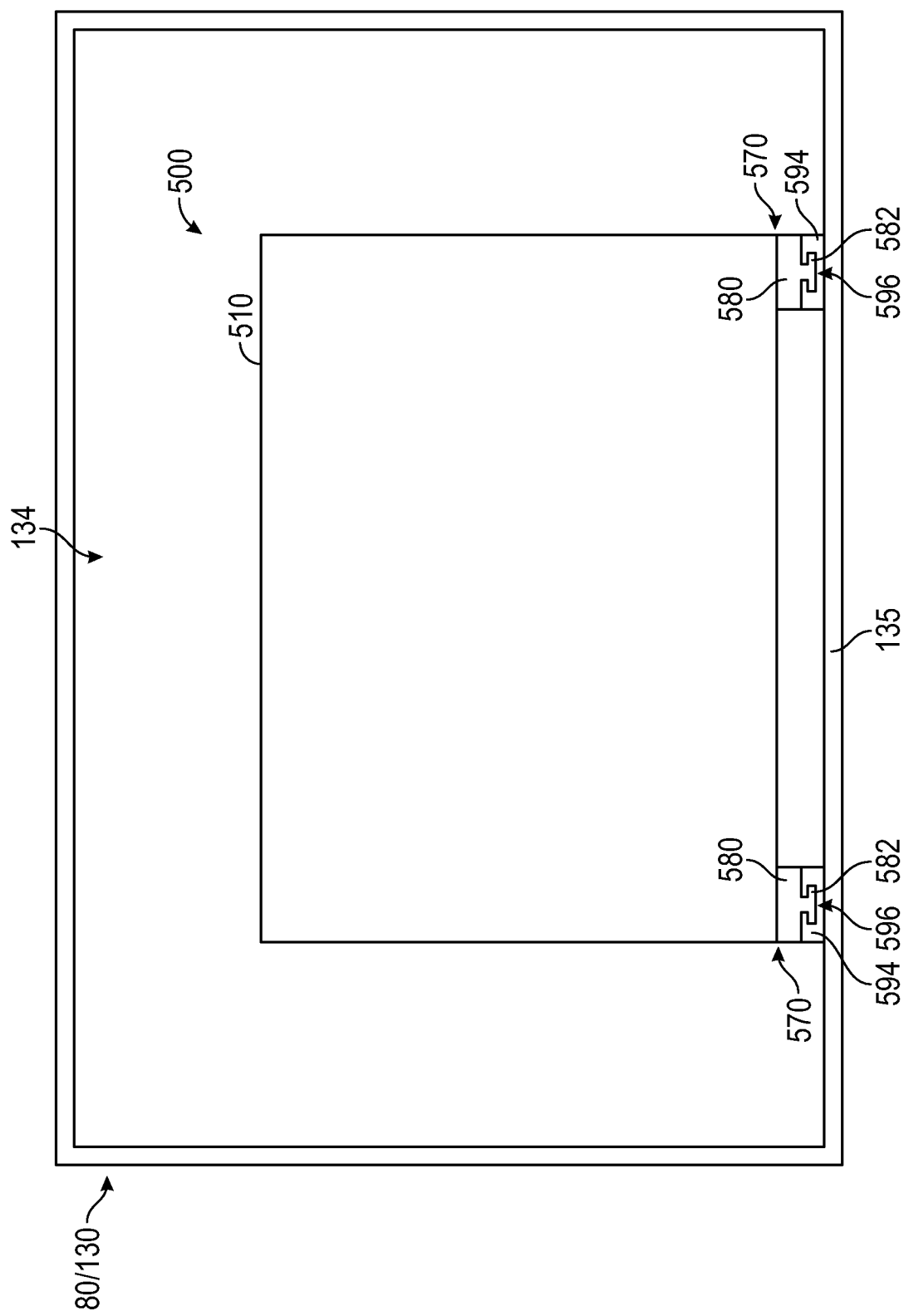

As shown in FIGS. 23-25, the mounting assembly 570 is configured to facilitate coupling or mounting the delivery charger 500 to a bottom surface, shown as floor 135, of the refuse compartment 130. As shown in FIG. 23, the refuse compartment 130 includes retainers, shown as clamps 592, disposed along the floor 135 thereof and that are configured to engage with the feet 574 of the delivery charger 500 to facilitate releasably coupling the delivery charger 500 to the floor 135 and within the refuse compartment 130. As shown in FIG. 24, the refuse compartment 130 includes mounting pads or tracks, shown as tracks 594, disposed along the floor 135 thereof and that are configured to engage with the feet 574 of the delivery charger 500 to facilitate releasably coupling the delivery charger 500 to the floor 135 and within the refuse compartment 130 using the fasteners 590. In other embodiments, the feet 574 are directly coupled to the floor 135 using the fasteners 590. As shown in FIG. 25, the tracks 594 define a passage or guide, shown as channel 596. According to an exemplary embodiment, the keys 582 of the feet 580 are received within the channels 596 of the tracks 594, which permits sliding the delivery charger 500 along the floor 135. Once is a desired position, the delivery charger 500 can be secured in place (e.g., using clamps, fasteners, straps, etc.). The keys 582 and the channels 38, thereby, facilitate releasably and slidably coupling the delivery charger 500 to the floor 135. In other embodiments, the feet 580 define the channels 596 and the tracks 594 include the keys 582. In some embodiments, the same delivery charger 500 can be coupled to the chassis 20 and the floor 135 (i.e., the mounting assembly 570 works with both the chassis mounted implementation and the body mounted implementation). In some embodiments, the type of mounting assembly 570 used with the delivery charger 500 is interchangeable or swappable based on the vehicle 10 and/or where the delivery charger 500 is being mounted.

C. Lift Assembly Mounted Delivery Charger

Figure 26:
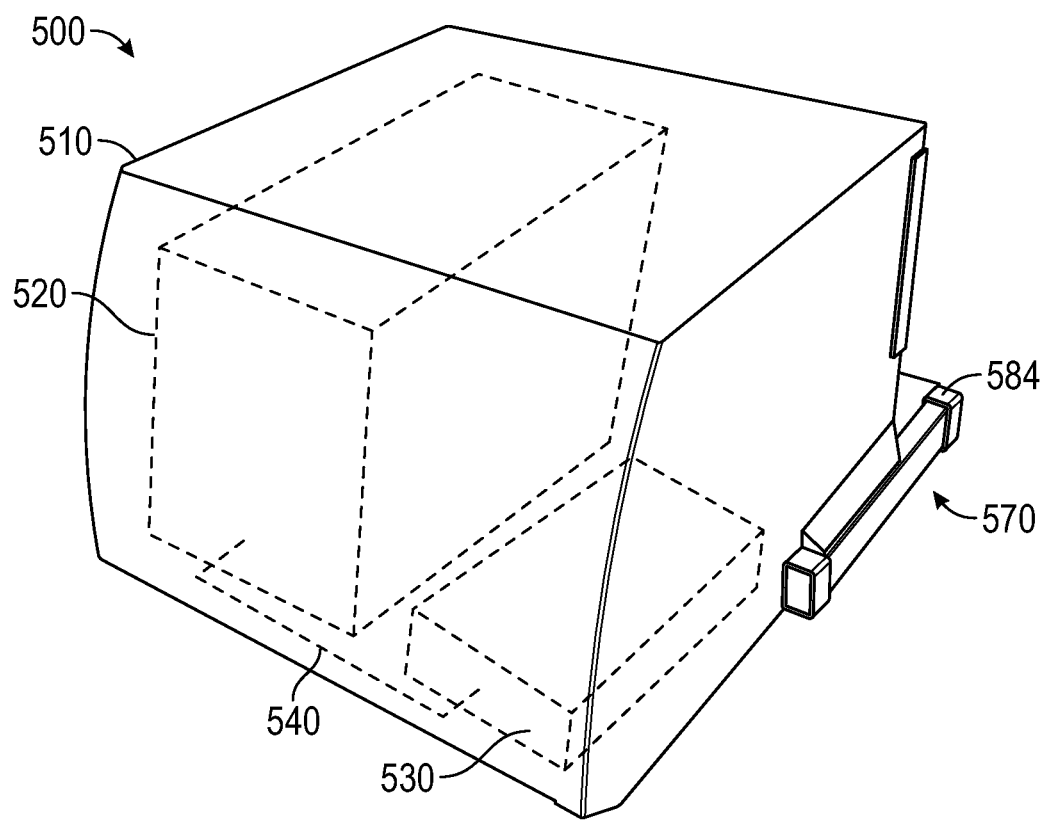
FIG. 26 is a perspective view of an auxiliary power unit, according to an exemplary embodiment.
Figure 28:
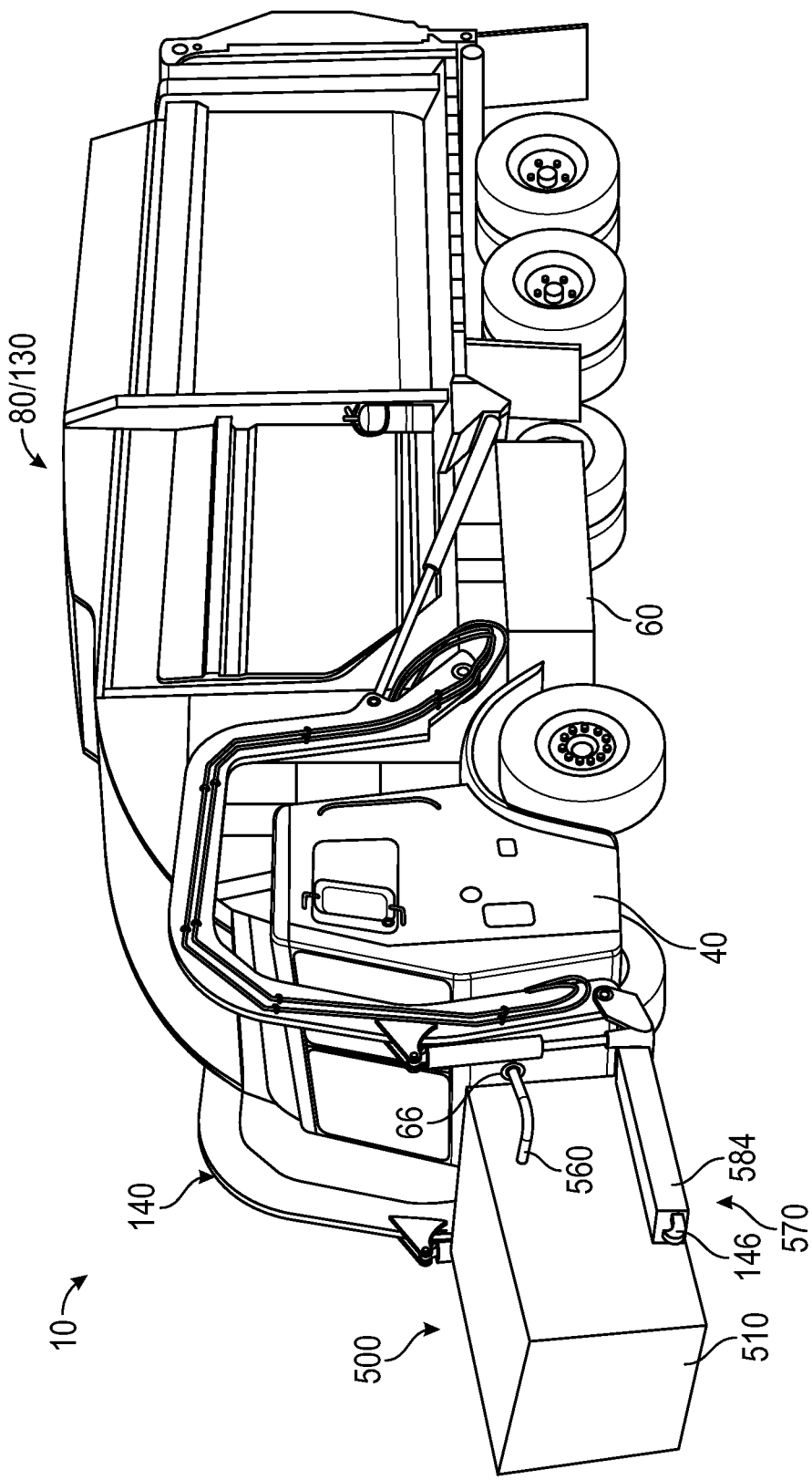
FIG. 28 is a perspective view of the vehicle of FIG. 1 with the auxiliary power unit of FIG. 26 in a charging position, according to an exemplary embodiment.

As shown in FIGS. 26 and 28, the mounting assembly 570 of the delivery charger 500 includes a pair of interfaces, shown as fork pockets 584, coupled to and positioned along the sides of the housing 510. As shown in FIG. 28, the lift forks 146 of the lift assembly 140 are configured to selectively engage with the fork pockets 584 to selectively mount the delivery charger 500 to the lift assembly 140. In other embodiments, the lift forks 146 and the fork pockets 584 are replaced with the attachment assembly/system disclosed in U.S. Patent Publication No. 2022/0219896, filed Dec. 21, 2021, which is incorporated herein by reference in its entirety.

Figure 27:
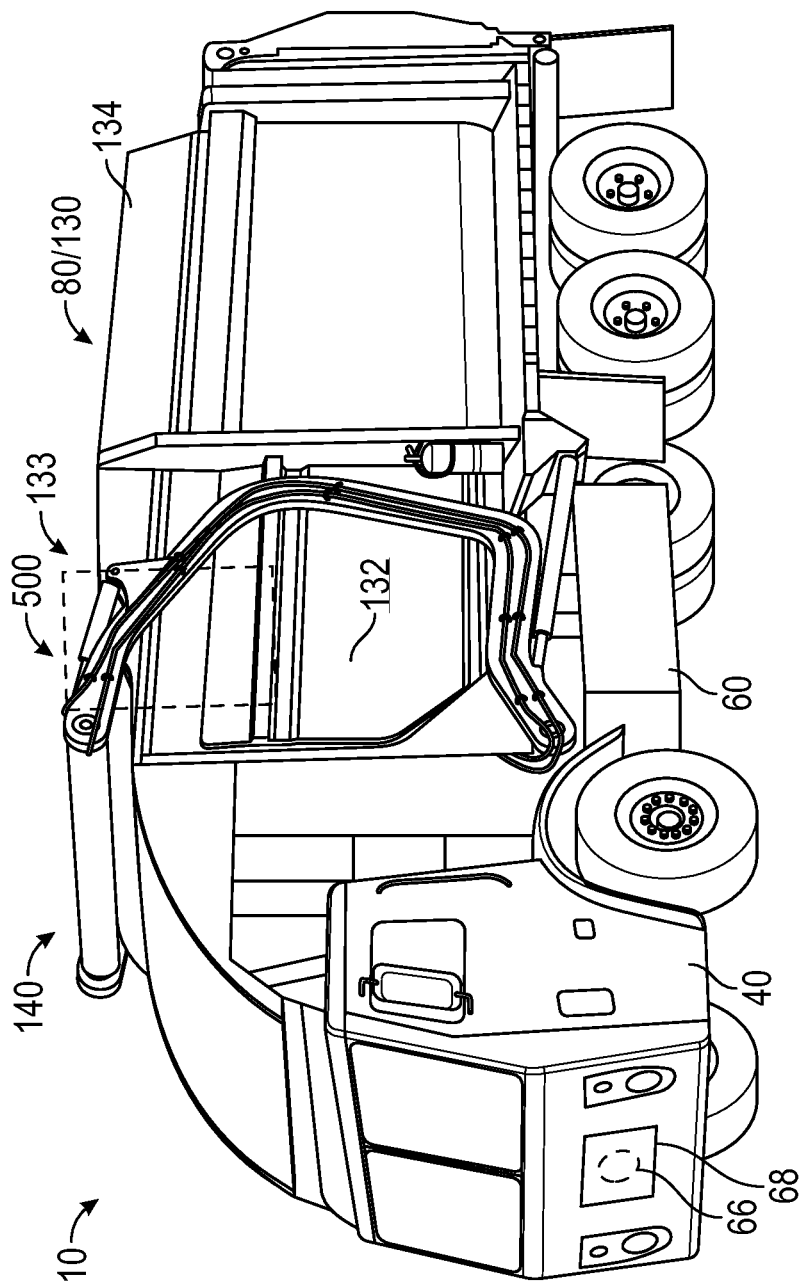
FIG. 27 is a perspective view of the vehicle of FIG. 1 with the auxiliary power unit of FIG. 26 in a stowed position, according to an exemplary embodiment.

As shown in FIGS. 27 and 28, the delivery charger 500 is repositionable via the lift assembly 140 between (i) a stowed position where the delivery charger 500 is lifted over the cab 40 into the hopper inlet 133 and stowed within the hopper volume 132 (as shown in FIG. 27) and (ii) a charge position where the delivery charger 500 is lowered and positioned in front of the cab 40 (as shown in FIG. 28). By way of example, the delivery charger 500 may be repositioned into the stowed position when the delivery charger 500 is not in use (e.g., when the vehicle 10 is driving, when the vehicle 10 is traveling at high speeds, when the batteries 60 do not need charging, etc.). The delivery charger 500 may be repositioned into the charge position to charge the batteries 60 (e.g., when the batteries 60 are depleted, when the vehicle 10 is stationary, etc.). As shown in FIGS. 27 and 28, the charge port 66 is positioned at the front of the cab 40 behind a panel, shown as charge door 68. Therefore, when the delivery charger 500 is in the charge position, as shown in FIG. 28, the charge cable 560 only needs to extend a short distance to the charge port 66 to charge the batteries 60. In other embodiment, the charge port 66 is otherwise positioned (e.g., on the housing of the batteries 60, etc.). In some embodiments, the delivery charger 500 with the fork pockets 584 can be coupled to the chassis 20 (e.g., prior to the application kit 80 or the refuse compartment 130 being installed) and/or the floor 135 (e.g., prior to the lift assembly 140 being installed) using any of the various mounting techniques described herein.

D. Retrieval of Delivery Charger

After the vehicle 10 has been driven with the delivery charger 500 to the second location or the delivery location, the delivery charger 500 can be temporarily stored and later retrieved. By way of example, many of the vehicles 10 may be delivered to the same destination or in a similar area. Once a certain number of the delivery chargers 500 have been accumulated within an certain area, the delivery chargers 500 may be collected and shipped in bulk (e.g., on a flat-bed truck, in a semi-truck, in a shipping container, etc.) back to the manufacturing site where the delivery chargers 500 can be reused.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:
1. An electric vehicle system comprising:
an electric vehicle including:
a chassis defining a first mounting interface;
a cab coupled to a front end of the chassis; and
a battery supported by the chassis; and
a delivery charger including:
a support;
a mounting assembly coupled to the support; and
an electrical energy source coupled to the support;
wherein the electrical energy source is configured to provide electricity to charge the battery; and
wherein the mounting assembly is configured to facilitate releasably mounting the delivery charger (i) to the first mounting interface of the chassis prior to a body assembly of the electric vehicle being installed onto the chassis and (ii) to a second mounting interface of the body assembly when the body assembly is coupled to the chassis.

2. The electric vehicle of claim 1, wherein the electrical energy source includes:
a power generator coupled to the support; and
a fuel tank coupled to the support and fluidly coupled to the power generator;
wherein the power generator is configured to receive a fuel from the fuel tank and generate the electricity to charge the battery.

3. The electric vehicle system of claim 2, wherein the fuel is a combustible fuel, and wherein the power generator includes an internal combustion engine and an electromagnetic device.

4. The electric vehicle system of claim 2, wherein the fuel is hydrogen, and wherein the power generator includes a fuel cell.

5. The electric vehicle system of claim 1, wherein the electrical energy source includes at least one of a supplementary battery or a solar panel.

6. The electric vehicle system of claim 5, wherein the electrical energy source includes the solar panel, and wherein the solar panel is directly connectable to the battery.

7. The electric vehicle system of claim 5, wherein the electrical energy source includes the supplementary battery and the solar panel, and wherein the solar panel is directly connectable to at least one of the supplementary battery or the battery.

8. The electric vehicle system of claim 1, wherein the second mounting interface is positioned along a floor of the body assembly, and wherein the mounting assembly is configured to facilitate releasably mounting the delivery charger within the body assembly.

9. The electric vehicle system of claim 8, wherein the delivery charger, at least when coupled to the body assembly, includes an exhaust conduit that is configured to extend from the electrical energy source through an opening in the body assembly to an ambient environment.

10. The electric vehicle system of claim 8, wherein the electric vehicle includes a charging port for the battery that is accessible from an interior of the body assembly when the body assembly is coupled to the chassis.

11. The electric vehicle system of claim 8, wherein the electric vehicle include a charging port for the battery that is accessible from an exterior of the body assembly when the body assembly is coupled to the chassis, and wherein the delivery charger, at least when coupled to the body assembly, includes a charging cable that is configured to extend from the electrical energy source through an opening in the body assembly to the charging port.

12. The electric vehicle system of claim 1, wherein the body assembly includes a refuse body and a lift assembly coupled to the refuse body, wherein the lift assembly includes the second mounting interface, and wherein the mounting assembly includes (i) a first mounting sub-assembly configured to facilitate releasably mounting the delivery charger to the first mounting interface of the chassis prior to a body assembly of the electric vehicle being installed onto the chassis and (ii) a second mounting sub-assembly configured to facilitate releasably mounting the delivery charger to second mounting interface of the lift assembly when the body assembly is coupled to the chassis.

13. The electric vehicle system of claim 12, wherein, with the lift assembly in a first position, the delivery charger is electrically connectable to a charging port positioned at the front of the cab, and wherein, with the lift assembly in a second position, the delivery charger is positioned at least partially within the body assembly.

14. An electric vehicle system comprising:
an electric vehicle including:
a chassis;
a cab coupled to a front end of the chassis;
a body coupled to the chassis, the body defining a refuse compartment and having a floor with a mounting interface; and
a battery supported by the chassis; and
a delivery charger releasably insertable into the refuse compartment, the delivery charger including:
a support;
an electrical energy source coupled to the support; and
a mounting assembly coupled to the support;
wherein the electrical energy source is configured to provide electricity to charge the battery; and
wherein the mounting assembly is configured engage with the mounting interface to facilitate releasably mounting the delivery charger along the floor and inside of the refuse compartment.

15. The electric vehicle system of claim 14, wherein the electrical energy source includes at least one of (i) a genset including an internal combustion engine and an electromagnetic device, (ii) a fuel cell, (iii) a supplementary battery, or (iv) a solar panel.

16. An electric vehicle system comprising:
an electric refuse vehicle including:
a chassis;
a cab coupled to a front end of the chassis;
a body assembly coupled to the chassis behind the cab, a top portion of the body assembly defining a hopper inlet;
a charging port;
a lift assembly coupled to the body assembly, the lift assembly repositionable between a stowed position and a charge position; and
a battery supported by the chassis; and
a delivery charger including:
a support;
an electrical energy source coupled to the support; and
a mounting assembly coupled to the support, the mounting assembly configured to facilitate releasably mounting the delivery charger to the lift assembly;
wherein, with the lift assembly in the stowed position, the delivery charger is lifted and at least partially extends into the body assembly through the hopper inlet; and
wherein, with the lift assembly repositioned to the charge position, the delivery charger is removed from the body assembly and lowered towards the ground such that the delivery charger can be electrically connected to the charging port.

17. The electric vehicle system of claim 14, wherein the delivery charger includes an exhaust conduit that is configured to extend from the electrical energy source through the refuse compartment to an opening in the body assembly and through the opening to an ambient environment.

18. The electric vehicle system of claim 14, wherein the electric vehicle includes a charging port for the battery that is accessible from an interior of the body assembly, and wherein the delivery charger includes a charging cable configured to extend from the electrical energy source to the charging port without extending outside of the refuse compartment.

19. The electric vehicle system of claim 14, wherein the electric vehicle includes a charging port for the battery that is accessible from an exterior of the body assembly, and wherein the delivery charger includes a charging cable that is configured to extend from the electrical energy source through the refuse compartment to an opening in the body assembly and through the opening to the exterior to be connected to the charging port.

* * * * *